US011606201B2

(12) United States Patent
Levy

(10) Patent No.: US 11,606,201 B2
(45) Date of Patent: Mar. 14, 2023

(54) CRYPTOGRAPHIC SYSTEMS AND METHODS USING DISTRIBUTED LEDGERS

(71) Applicant: Intertrust Technologies Corporation, Sunnyvale, CA (US)

(72) Inventor: Caleb Levy, Princeton, NJ (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 42 days.

(21) Appl. No.: 17/322,760

(22) Filed: May 17, 2021

(65) Prior Publication Data

US 2021/0273791 A1 Sep. 2, 2021

Related U.S. Application Data

(63) Continuation of application No. 16/420,833, filed on May 23, 2019, now Pat. No. 11,038,676.

(Continued)

(51) Int. Cl.
| | |
|---|---|
| *H04L 9/08* | (2006.01) |
| *G06F 16/18* | (2019.01) |
| *G06F 16/182* | (2019.01) |
| *H04L 9/06* | (2006.01) |
| *H04L 9/00* | (2022.01) |
| *H04L 9/32* | (2006.01) |

(52) U.S. Cl.
CPC ........ *H04L 9/0847* (2013.01); *G06F 16/1805* (2019.01); *G06F 16/1824* (2019.01); *H04L 9/0643* (2013.01); *H04L 9/0819* (2013.01); *H04L 9/50* (2022.05)

(58) Field of Classification Search
CPC ... H04L 9/0847; H04L 9/0643; H04L 9/0819; H04L 9/50; H04L 9/0866; H04L 9/3239; H04L 9/3247; H04L 9/3263; H04L 9/3297; G06F 16/1805; G06F 16/1824
See application file for complete search history.

(56) References Cited

U.S. PATENT DOCUMENTS

| | | |
|---|---|---|
| 8,135,714 B2 | 3/2012 | Wilson |
| 9,594,739 B2 | 3/2017 | Dunn et al. |
| | (Continued) | |

OTHER PUBLICATIONS

Arrendondo, "Blockchain and Certificate Authority Cryptography for an Asynchronous On-Line Public Notary System." The University of Texas at Austin., 2017, pp. 1-119. (119 pgs).

(Continued)

*Primary Examiner* — Darren B Schwartz
(74) *Attorney, Agent, or Firm* — John P. Davis; Thayne and Davis LLC

(57) ABSTRACT

The disclosure relates to, among other things, systems and methods for facilitating the secure recording of assertions made by entities tied to identities. Embodiments of the disclosed systems and methods may allow users to make non-revocable, difficult to forge, cryptographic assertions tied to their identities through the posting of entries in an immutable ledger. In certain embodiments, a user's cryptographic assertions may be preceded by ledger entries which feature certificates from trusted authorities that tie the keys used for making assertions to the user's identity. Further embodiments provide for a mechanism for disabling further entries posted under a user's key, either automatically or at the user's initiation.

20 Claims, 15 Drawing Sheets

Related U.S. Application Data

(60) Provisional application No. 62/676,468, filed on May 25, 2018.

(56) References Cited

U.S. PATENT DOCUMENTS

| | | | |
|---|---|---|---|
| 9,749,410 | B2 | 8/2017 | Oberhauser et al. |
| 9,882,918 | B1 | 1/2018 | Ford et al. |
| 9,948,467 | B2 | 4/2018 | King |
| 10,102,526 | B1 | 10/2018 | Madisetti |
| 10,547,457 | B1* | 1/2020 | Duccini .................. H04L 63/06 |
| 10,671,733 | B2* | 6/2020 | Baker .................. H04L 63/306 |
| 10,833,843 | B1* | 11/2020 | Vijayvergia ............ H04L 9/088 |
| 2007/0179872 | A1 | 8/2007 | Macalka et al. |
| 2015/0332283 | A1 | 11/2015 | Witchey |
| 2016/0260169 | A1* | 9/2016 | Arnold ................. G06Q 20/023 |
| 2016/0330027 | A1 | 11/2016 | Ebrahimi |
| 2017/0249482 | A1 | 8/2017 | Takaai et al. |
| 2017/0301047 | A1* | 10/2017 | Brown ............... G06Q 20/3827 |
| 2017/0316390 | A1 | 11/2017 | Smith et al. |
| 2017/0316497 | A1* | 11/2017 | Song .................... H04L 9/3268 |
| 2017/0317834 | A1 | 11/2017 | Smith et al. |
| 2017/0330179 | A1 | 11/2017 | Song et al. |
| 2017/0331810 | A1* | 11/2017 | Kurian .................. H04L 63/108 |
| 2017/0338967 | A1 | 11/2017 | Lewison et al. |
| 2017/0346639 | A1 | 11/2017 | Muftic |
| 2018/0006826 | A1 | 1/2018 | Smith et al. |
| 2018/0019879 | A1 | 1/2018 | Kravtiz et al. |
| 2018/0048461 | A1 | 2/2018 | Jutla et al. |
| 2018/0060496 | A1 | 3/2018 | Bulleit et al. |
| 2018/0075028 | A1 | 3/2018 | Ruschin et al. |
| 2018/0115416 | A1 | 4/2018 | Diehl |
| 2018/0139186 | A1* | 5/2018 | Castagna ............. H04L 9/0861 |
| 2018/0183586 | A1 | 6/2018 | Bhargav-Spantzel et al. |
| 2018/0204191 | A1 | 7/2018 | Wilson et al. |
| 2018/0227293 | A1* | 8/2018 | Uhr ......................... G06F 21/64 |
| 2018/0253452 | A1* | 9/2018 | Callan .................. H04L 9/3239 |
| 2018/0288022 | A1 | 10/2018 | Madisetti et al. |
| 2018/0294977 | A1* | 10/2018 | Uhr ......................... G06F 21/33 |
| 2019/0028277 | A1* | 1/2019 | Jayachandran .......... H04L 9/085 |
| 2019/0123889 | A1 | 4/2019 | Schmidt-Karaca |
| 2019/0123895 | A1* | 4/2019 | Blake .................... H04L 67/133 |
| 2019/0182033 | A1* | 6/2019 | Li ............................ G06F 16/13 |
| 2019/0260593 | A1* | 8/2019 | Bisti .................... H04L 9/3239 |
| 2019/0295202 | A1* | 9/2019 | Mankovskii .......... H04L 9/3218 |
| 2019/0327216 | A1 | 10/2019 | Walters |
| 2019/0334700 | A1* | 10/2019 | Callan .................. H04L 9/0825 |
| 2021/0091934 | A1* | 3/2021 | Fletcher ................ H04L 9/0847 |

OTHER PUBLICATIONS

Crosby et al., "BlockChain Technology: Beyond Bitcoin." Applied Innovation Review, 2016, (2): pp. 6-19. doi:10.15358/0935-0381-2015-4-5-222. (16 pgs).

Fromknecht et al., "A Decentralized Public Key Infrastructure with Identity Retention." Cryptology ePrint Archive, 2014, pp. 1-16. (16 pgs).

Gipp et al., "Decentralized Trusted Timestamping Using the Crypto Currency Bitcoin," iConference, 2015, pp. 1-6. http://arxiv.org/abs/1502.04015. (6 pgs).

Lemieux et al., "Evaluating the Use of Blockchain in Land Transactions: An Archival Science Perspective." European Property Law Journal, 2017, 6 (3):, pp. 392-440, doi:10.1515/eplj-2017-0019. (49 pgs).

Ratnayake, "PKI Based Encryption for Document Sharing, Optimized Storage and Proof of Existence in the Cloud," Degree Project, in Information and Communication Systems Security, Second Level, 2015, pp. 1-31. (31 pgs).

Yue et al., "Healthcare Data Gateways: Found Healthcare Intelligence on Blockchain with Novel Privacy Risk Control." Journal of Medical Systems, 2016, 40 (10), pp. 1-8. doi:10.1007/s10916-016-0574-6. (8 pgs).

Notice of Allowance Issued in U.S. Appl. No. 16/420,833, dated Feb. 19, 2021. (12 pgs).

\* cited by examiner

| Entry *i* | Authority Deciphering Key [$D_{AUTH}$] |
|---|---|
| Certifying Message for User [$M_{CERT}$] Including:<br>• User Deciphering Key [$D_{USER}$]<br>• User Identification [e.g., name, address, etc.]<br>• SIGN(Documentation, $E_{USER}$)<br>• SIGN(Documentation, $E_{AUTH}$) | |
| SIGN($M_{CERT}$, $E_{AUTH}$)<br>SIGN($M_{CERT}$, $E_{USER}$) [Optional] | |

CRYPTOGRAPHIC SYSTEMS AND METHODS USING DISTRIBUTED LEDGERS

RELATED APPLICATIONS

This application is a continuation of U.S. application Ser. No. 16/420,833, filed May 23, 2019, and entitled "CRYPTOGRAPHIC SYSTEMS AND METHODS USING DISTRIBUTED LEDGERS," which claims priority under 35 U.S.C. § 119(e) to U.S. Provisional Patent Application No. 62/676,468, filed May 25, 2018, and entitled "CRYPTOGRAPHIC SYSTEMS AND METHODS USING DISTRIBUTED LEDGERS," the contents of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to cryptographic systems and methods. More specifically, but not exclusively, the present disclosure relates to cryptographic systems and methods that use trusted distributed ledgers.

Blockchain technologies and/or associated immutable ledgers may be used in connection with implementing and augmenting the functions of a public key infrastructure, cryptographic assertions, identity certification and verification, timestamping, and/or related services. Embodiments of the systems and methods presented herein allow for, among other things, users to make cryptographic assertions tied to their identity in a manner such that assertions may not be easily repudiated and may remain valid, even when both the user's and the signing authority's private keys are compromised or lost, a paradigm where the compromise of a user's and/or authority's private keys do not place the user at risk of impersonation, and/or both users and authorities are protected from malfeasances of other parties.

Various disclosed embodiments may use distributed immutable message ledgers, which may be referred to herein in certain instances as distributed ledgers, message ledgers, trusted immutable distributed assertion ledgers ("TIDALs"), trusted ledgers, and/or various of the same. Ledgers consistent with various aspects of the disclosed embodiments may be associated with a variety of properties including, for example, ledger processes that may be resistant to byzantine failures, entries that may be immutable and/or relatively immutable, entries that may be time-synced (at least in part), entries that may be scalable, and/or entries that may be available for relatively fast lookup.

Distributed ledgers may be used in connection with various blockchain technologies. Users of distributed ledgers may post entries into a sequenced database. Each entry may have an associated message, a signature of the message, and some associated deciphering key which others can use to verify that a person with the deciphering key's associated enciphering key has signed the message.

In message ledgers, entries may be appended to the ledger. Each addition of an entry may be witnessed by a number of parties, and entries may be accompanied by various auxiliary cryptographic information to ensure that changes to messages in the database and/or the ordering of entries can be detected. Entries may reside in a unique numerical position in the ledger, and once all witnesses agree to add an entry to the ledger, it may be assumed that the entry's presence, contents, and/or position may not be altered without detection by the witnesses.

Witnesses may take a variety of forms. For example, in blockchain-based cryptographic currencies, a witness may be any suitably configured computer. In other implementations, permissioned systems associated with independent entities and/or companies joined in a consortium may operate as witnesses.

In connection with a message ledger, it may be difficult to securely associate a deciphering key to a specific person and/or identity. Any person might be able to create an enciphering key and post messages to such a ledger. In principal, however, one user may not necessarily be prevented from claiming to be another and posting messages in the other's name. Another form of possible fraud stems from the possibility of a forger compromising someone's enciphering key without the victim's knowledge. If a stolen key has already been associated with a victim, then a forger may make statements in the victim's name that the victim may not be able to repudiate. Various aspects of the disclosed systems and methods may address these and/or other situations.

Embodiments of the disclosed systems and methods may use trusted entities that in some instances may be referred to herein as name authorities. Name authorities may be associated with entities that bind enciphering keys to specific people and/or identities. In the public key infrastructure ("PKI") of the internet, this role may be played by certificate authorities ("CAs") and/or registration authorities ("RAs"). In connection with the disclosed embodiments, any entity trusted by the ledger's maintainers may also fill this role. Various embodiments described herein may enable name authorities to post certificates on the ledger that associate keys with identities. Users can check the correctness of the name authority's entry on the chain, after which they can submit messages to the ledger in their name using their enciphering key.

Various embodiments disclosed herein invention may provide mechanisms for users to disable further messages signed with their keys. For example, users may post terminal messages to a ledger. After a user posts a terminal message to the ledger, even a person who compromises the user's enciphering key cannot impersonate the user. Embodiments disclosed herein may also allow a user to request that a name authority post a confirmation entry to the ledger, allowing the user to make an endorsed statement declaring that all entries recorded under their key are legitimate.

In connection with the disclosed embodiments, users may maintain control of their keys for some period of time. In some circumstances, this period may only be hours to a few weeks, depending on how a given name authority implements its identity verification processes. Furthermore, embodiments disclosed herein may provide measures to mitigate the effects of a user's key being compromised at each step along the way to making a cryptographic assertion. For example, in some embodiments, the name authority, an organization specifically dedicated to maintaining tight control of enciphering keys and verifying peoples' identities, may be assumed to not be compromised over long periods of time. Mechanisms are also disclosed herein for mitigating the number of messages endorsed by a name authority whose integrity becomes suspect in the event where the name authority's keys are themselves compromised.

Embodiments of the disclosed systems and methods may also provide ways of using the above-described protocols to allow users to prove that they have possession of a file, document, statement, and/or other data at a certain time, without revealing the contents of the file, document, statement, and/or data to other parties. In some embodiments, this may include preventing name authorities themselves from seeing the files, documents, statements, and/or data in question.

Name authorities and/or certificate authorities may arise due to the difficulty for most users to securely guard enciphering keys over long timeframes against sustained and/or targeted attacks. Guarding these keys against determined, well-funded attackers, may require teams of many people with expert and specialized knowledge in computer security and/or well-instilled procedural discipline. Secure operating practices may be embedded in a corporate culture to protect sensitive cryptographic information for the long term. In certain circumstances, it may prove difficult for average users to maintain control and secrecy of their enciphering keys for extended periods of time.

Various implementations of assertion ledgers, including many blockchain-based cryptographic currencies, may presume that users maintain complete control of their enciphering keys over long periods (e.g., indefinitely). Furthermore, once a user's enciphering key is compromised, existing entries become suspect, as detecting compromise is often difficult.

Embodiments disclosed herein may mitigate at least some of these issues. Additionally, various disclosed embodiments may provide users and/or name authorities with some level of recourse in the case that one contests the others' claims. For example, a name authority might wish to prove it followed procedure when issuing a certificate on the ledger that binds a user to a key in a case where the user claims malfeasance on the name authority's part.

Consistent with various aspects of embodiments of the disclosed systems and methods, users may make non-revocable, difficult to forge, cryptographic assertions tied to their identities through the posting of entries in an immutable ledger. In certain embodiments, a user's cryptographic assertions may be preceded by ledger entries which feature certificates from trusted authorities that tie the keys used for making assertions to users' identities. The certifying messages may potentially include a hashed value of a documentation file that may serve to protect users and/or authorities from liability in cases where either is accused of malfeasance.

In some embodiments, assertions themselves may be added as ledger entries signed by the user's private key, and a mechanism may be provided for disabling further entries posted under a single user's key, either automatically and/or at the user's initiation.

In certain embodiments, a mechanism may be provided for suffixing assertions with certificates of confirmation and/or revocation of the assertions. The confirmation certificates may be signed by trusted authorities and be accompanied by a hash of a documentation file.

Further embodiments may provide for methods of making non-revocable, difficult to forge, cryptographic assertions tied to aliases of user's identities through the posting of entries in a ledger. In some embodiments, aliases may be derived from a user's identifying information while providing little to no useful identifying information about the user. The user's cryptographic assertions may be preceded by ledger entries which feature certificates from trusted authorities that tie the keys used for making assertions to the aliases. The certifying messages may potentially include the hashed value of a documentation file.

In some embodiments, a user's identity can be revealed by posting of entries signed by an authority that comprise information that identifies the user from which the alias can be derived and/or demonstrates that an identity was once certified by an authority.

In various embodiments, the assertions themselves may be added as ledger entries signed by a user's private enciphering key. A mechanism may be provided for disabling further entries posted under the user's key, either automatically or at the user's initiation. Users may include cryptographic proofs of possession of certain documentation of their identities at the time of making these entries inside of the entries themselves, and trusted authorities may demand users provide the corresponding documentation before adding the entries to a ledger. Certificates may be issued and featured in subsequent ledger entries that tie the keys that users employed for making assertions to said users' identities. In certain embodiments, certifying messages may include the hash value of a documentation file.

In various embodiments, messages may include cryptographic timestamps added by a trusted authority prior to being signed and/or posted to a ledger.

In some embodiments, methods are presented that reduce a number of assertions made whose integrity may be called into question and/or reduce a trusted authority's liability in the event that the trusted authority's security is compromised. Such methods may employ one or more policies designed to limit a number of assertions that a trusted authority is able to certify using a single key on a given ledger and/or a mechanism for trusted authorities to decommission old keys and associated new keys to their identity, performed by adding entries to the ledger signed by the authority's old keys. Such entries may include a statement of the authority's intention to decommission the old key and associate the new key to its identity, a signature of statement which is enciphered using the new key, and optionally, authority-imposed restrictions on the new keys.

In certain embodiments, a method for recording a message secure associated with an identity in a trusted ledger may include generating a user deciphering key and a corresponding user enciphering key. The user deciphering key may comprise a public key and the user enciphering key may comprise a private key. A trusted ledger managed by a ledger management system may be examined to determine that the trusted ledger does not include any entries associated with the user deciphering key, ensuring its uniqueness within the context of the trusted ledger.

A request may be transmitted to a trusted authority, which may comprise a name authority, to associate a user deciphering key with an identity associated with a user and/or to record the association as an entry in the trusted ledger. In certain embodiments, transmitting the request to the trusted authority to associate the user deciphering key with the identity associated with the user system may include requesting that trusted authority generate the first entry and transmit the first entry to the ledger management system for recording in the trusted ledger. In some embodiments, the request to the trusted authority may further comprise documentation information attesting to the identity associated with the user system.

The first entry may be associated in the trusted ledger with a deciphering key of the trusted authority. In certain embodiments, the first entry may comprise a certification message and a signature of the certification message generated using an enciphering key of the trusted authority. In various embodiments, the certification message may comprise one or more of the user deciphering key, user identification information, a hash of the documentation information, an indication of a number of times the user deciphering key may be used to record entries in the trusted ledger, and/or an indication of a length of time the user deciphering key may be used to record entries in the trusted ledger.

In further embodiments, transmitting the request to the trusted authority to associate the user deciphering key with the identity associated with the user system may include requesting that the trusted authority generate a certification message that includes a certificate from the trusted authority and a signature of the certificate generated using an enciphering key of the trusted authority. In some embodiments, the request to the trusted authority may further comprise documentation information attesting to the identity associated with the user system.

The certificate from the trusted authority may comprise one or more of a trusted authority deciphering key, the user deciphering key, user identification information, a hash of the documentation information, an indication of a length of time the user deciphering key may be used to record entries in the trusted ledger, and/or an indication of a number of times the user deciphering key may be used to record entries in the trusted ledger. The certification message may be received from the trusted authority and the first entry may be transmitted for recordation in the trusted ledger such that the entry is associated with the user deciphering key.

A second entry may be generated and transmitted for recording in the trusted ledger associated with the user deciphering key that includes a message. The second entry may be recorded in the trusted ledger in a location after the first entry.

In some embodiments, a third entry associated with the user deciphering key may be generated and transmitted for recording the in the trusted ledger that comprises a termination message. In certain embodiments, the third entry may further comprise a signature of the termination message generated using the user enciphering key.

A request to confirm entries recorded in the trusted ledger associated with the user deciphering key may be transmitted to a trusted authority. In some embodiments, transmitting the request to the trusted authority to confirm entries recorded in the trusted ledger associated with the user deciphering key may include requesting that trusted authority generate a fourth entry and transmit the fourth entry to the ledger management system for recording in the trusted ledger. The fourth entry may be associated with the trusted authority deciphering key and may include a confirmation message and a signature of the confirmation message generated using an enciphering key of the trusted authority. In other embodiments, the fourth entry may be generated based on a confirmation certificate received from a trusted authority and transmitted by a user system to the ledger management system for recordation in the trusted ledger.

BRIEF DESCRIPTION OF THE DRAWINGS

The inventive body of work will be readily understood by referring to the following detailed description in conjunction with the accompanying drawings, in which:

FIG. 8 illustrates an example of a ledger entry certifying an association between an identity and a cryptographic assertion by a name authority consistent with certain embodiments disclosed herein.

DETAILED DESCRIPTION

Figure 1:
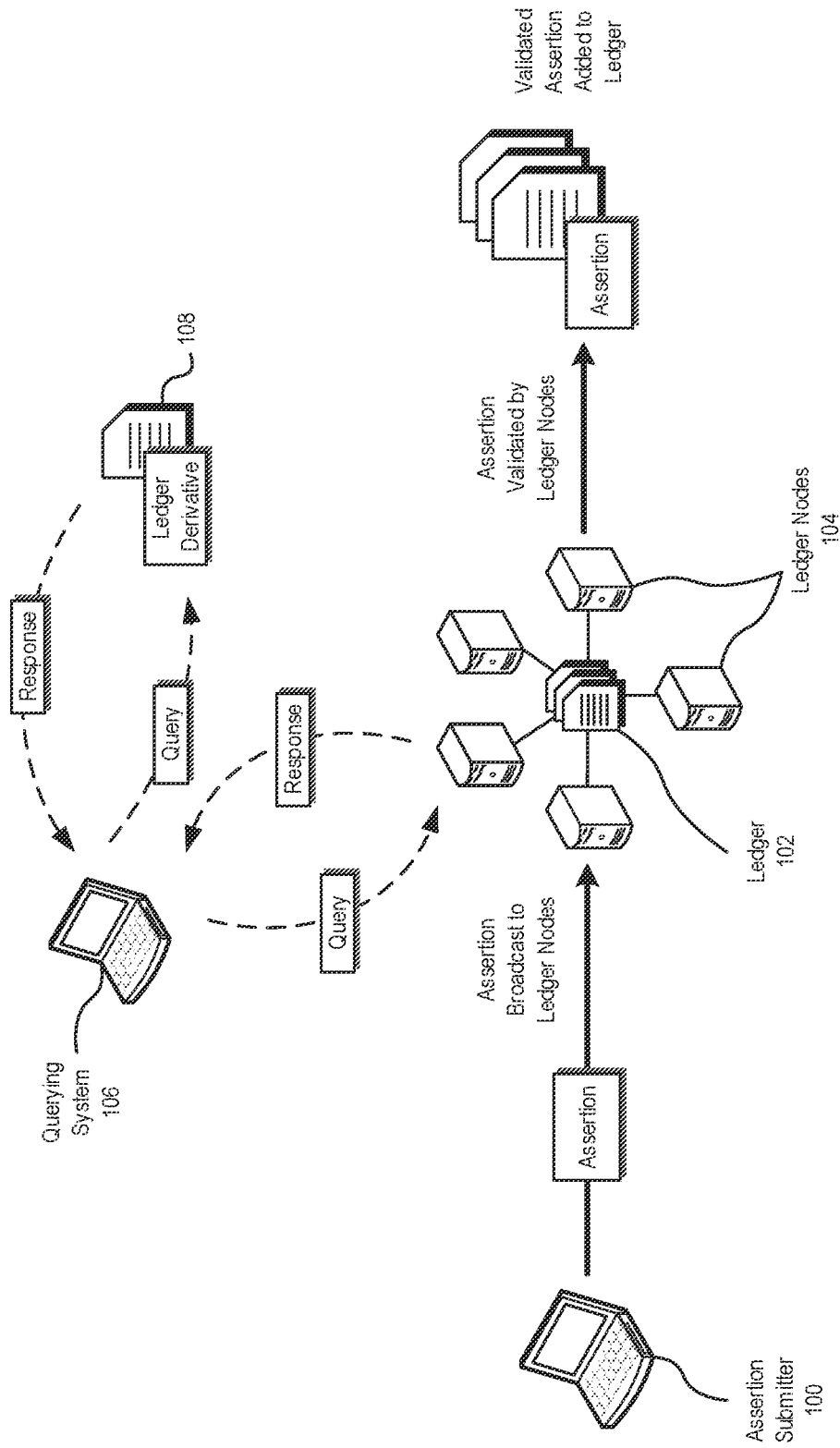
FIG. 1 illustrates an example of the management of a trusted ledger consistent with certain embodiments disclosed herein.

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts in certain instances may be designated by like numbers or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once and/or in their entirety, unless otherwise specified.

Embodiments of the systems and methods presented herein allow for, among other things, users to make cryptographic assertions tied to their identity. These assertions may be recorded in a manner such that assertions may not be easily repudiated and/or may remain valid, even when both the user's and the signing authority's private keys are compromised and/or lost. Various embodiments disclosed herein may further provide mechanisms for users to disable further messages signed with their keys and/or for making non-revocable, difficult to forge, cryptographic assertions that may be subsequently tied to user identities and/or alias thereof through the posting of entries in a ledger.

Assertion Recordation Using Trusted Ledgers

Trusted databases and/or ledgers consistent with various aspects of the disclosed embodiments may be associated with a variety of properties that may include one or more of:

Ledger processes that may be resistant to byzantine failures.

Entries that may be immutable.

Entries that may be time synched (at least in part). Distinguished sets of new entries (e.g., such as blocks in a blockchain) may have an immutable ordering whereby newer (e.g., newer in actual time) entries may be relatively higher in order than earlier entries. In some instances, entries may be timestamped to identify a specific time of entry.

Ledgers may be scalable in number of entries.

Entries in a ledger may be available for relatively fast lookup and/or search.

In certain embodiments, scalability and fast lookup and/or search may be achieved and/or otherwise improved by using derivatives of a ledger, if not by the ledger itself.

Consistent with various disclosed embodiments, trusted ledger paradigms may comprise permissioned blockchains that use efficient byzantine agreement protocols. In some embodiments, ledger entries may comprise assertions, made by a class of qualified submitters, that each binds a key (and/or a hash or other derivative of a key) with other attributes that are associated with that key, such as the identity of the owner and/or an alias thereof, the scope of authority of the owner, information rights management permissions, and/or the like.

A ledger may be distributed among a plurality of nodes. A full node may have a full copy of the ledger. In certain embodiments, ledger actors, nodes, and/or entities may include assertion submitters, witnesses and/or verifiers, and/or distributed ledger node operators.

In certain implementations, a number of ledgers may be employed, each of which may specialize in the recording of various types of assertions with appropriate policies for the associated assertion types. In some embodiments, a given application may rely on the authenticity of multiple assertions and may either directly and/or indirectly query multiple ledgers. For example, a ledger may be indirectly queried when a ledger derivative is queried. In some embodiments, a ledger derivative may comprise one or more databases and/or ledgers derived from information recorded in one or more other ledgers.

In some embodiments, ledgers may be used to collect assertions and/or evidence of authority for a node that affirms such information, allowing multiple parties to cross check for compliance with policy. Ledgers may record the authentication information (e.g., a hash of the assertion) in public parts of the database and/or ledger. In certain instances, some applications may record the hash of encrypted information. Other applications, however, may record the hash of the information plaintext in a way such that access to the authentication information is governed and/or may be modified (e.g., nullified). Access to unhashed plaintext information may be governed by applicable policies.

In certain embodiments, a ledger may comprise a blockchain, although other database and/or ledger structures may be used. For example, hashgraphs, tangles or directed, acyclic graphs, and/or the like may also be used in connection with various aspects of the disclosed embodiments. In some embodiments, ledgers may be publicly readable, but in other embodiments they may not necessarily be publicly readable. For example, in connection with various aspects of the disclosed embodiments, ledgers may not necessarily be publicly accessible in every application, with some applications using multiple ledgers, some of which may be public and some private. Furthermore, in some embodiments, a ledger may be replaced and/or used in conjunction with a database that lacks some of the properties of a ledger, as may be the case for parts of a protocol where distributed trust is not necessarily required.

FIG. 1 illustrates an example of the management of a trusted ledger 102 consistent with certain embodiments disclosed herein. In certain embodiments, the trusted ledger 102 may comprise a TIDAL and/or any other suitable type of distributed database and/or ledger in any suitable form.

As illustrated, an assertion submitter 100 may submit an assertion for recordation in the ledger 102. In some embodiments, the assertion submitter 100 may comprise an entity and/or system that possesses credentials indicating authority to submit assertions for consideration to be recorded in the ledger 102. For example, in some embodiments, the assertion submitter 100 may comprise a user system, a name authority and/or other authority, and/or the like.

In some embodiments, a submitted assertion may comprise an identifier associated with the assertion submitter 100 that may be used by various ledger nodes 104 in connection with a verification and/or witnessing process to determine whether the assertion submitter 100 has the requisite authority to make a submission of the specific type and/or with the scope reflected in the submitted assertion for inclusion in the ledger 102.

The submitted assertion may be broadcast to various ledger nodes 104 that may, among other things, maintain and/or otherwise manage the ledger 102 and in certain instances herein may be referred to as ledger management systems and/or nodes. In certain embodiments, at least a portion of ledger nodes 104 may be configured to verify submitted assertions prior to recordation of the assertions in the ledger 102. Consistent with various disclosed embodiments, assertions may be entered into the ledger 102 upon the agreement of multiple ledger nodes 104 operating as witnesses and/or verifiers. The ledger nodes 104 operating as witnesses and/or verifiers may verify the authenticity of the authority of the assertion submitter 100 to verify that the putative authority is in fact authorized to make the assertion in accordance with one or more applicable policies. In some embodiments, to verify the authenticity of the authority of the assertion submitter 100 to make the submitted assertion, the ledger nodes 104 may check previous entries in the ledger 102 and/or entries in other ledgers and/or associated ledger derivatives to verify that the assertion submitter 100 is authorized to make the submission to the ledger in accordance with applicable policy.

The ledger nodes 104, operating as witnesses, may verify a variety of information prior to recording a submitted assertion in the ledger 102. For example, the ledger nodes 104 may verify that an identifier submitted with the assertion (e.g., an ID of the assertion submitter 100, a public key, and/or the like) is valid and/or has not been revoked. The ledger nodes 104 may further verify that the submitter's scope of authority includes authority over the subject of the assertion. In certain embodiments, this may involve verifying prior submissions regarding the assertion submitter 100 included in the ledger 102.

In various embodiments, verified assertions may be placed into a pool to be entered into the ledger 102, and when a threshold number of ledger nodes 104 operating as witness agree regarding the authenticity and/or the actual authority of the assertion submitter 100 to make the assertion, the assertion may be recorded in the ledger 102. In certain embodiments, this agreement may be reached in accordance with an applicable agreement policy using, for example and without limitation, a byzantine agreement protocol and/or another suitable protocol. Once agreement has been reached, the assertion may be considered validated by the ledger nodes 104 and the submission may be recorded and/or otherwise entered into the ledger 102.

A querying system 106 interested in determining whether an assertion and/or a certain type of assertion (e.g., an assertion relating to a particular device and/or the like) has been recorded in the ledger 102 may be configured to query one or more of the ledger nodes 104 and/or other associated systems and receive associated responses. In various embodiments, the querying system 106 may query a system maintaining a ledger derivative 108, which may comprise one of the ledger nodes 104 and/or another system, and may receive associated responses indicative of assertions recorded in the ledger derivative 108 and/or the ledger 102.

Cryptographic Primitives and Terminology

In certain embodiments, messages, assertions, and/or entries in a ledger may comprise a string which may be a sequence of characters from a finite alphabet. Examples of strings include, without limitation, binary strings such as "10010" (e.g., strings made of bits) and character strings such as "abcdefg". In various embodiments, ledger entries may comprise one or more fields. Each field may comprise a string. The strings in a field may or may not have additional semantical structure and/or restrictions. For example, the first 128 bits of the message field might be designated to store contact information, such as an email address.

Entries themselves may be treated as structured strings for use inside of other entries. Additionally, in some embodiments, any file may be represented as a string of its binary bits, which makes string representations useful with hash functions, as described below.

It will be understood that there are many possible ways to arrange both the fields and subfields of an entry in a ledger consistent with the disclosed embodiments. For example, additional pieces of information might be used to properly interpret an entry in software (e.g., reserved bits in an entry field describing how long the message will be). In some embodiments, any ordering of the fields may be chosen, as long as software for reading and/or interacting with the ledger can properly interpret the entry's constituent fields in context.

It will be understood that the various examples of ledgers and/or entries described herein and/or illustrated in the figures may comprise entries preceding and/or following the illustrated first and/or terminal entries, and that a ledger consistent with various embodiments may further comprise one or more intermediate entries. For example, in the ledgers illustrated in FIG. 5, FIG. 6, FIG. 7, FIG. 12, FIG. 13, and FIG. 14, the first entry depicted may not necessarily represent the first entry in the ledger, and that the last entry depicted may not necessarily represent the last entry in the ledger, and/or there may be one or more further intermediate entries. Hence Entry i, which may certify a user's key, may not necessarily be the initial entry of the ledger itself, but may initiate the particular transaction which may allow a user to make an assertion $M_j$.

Figure 12:
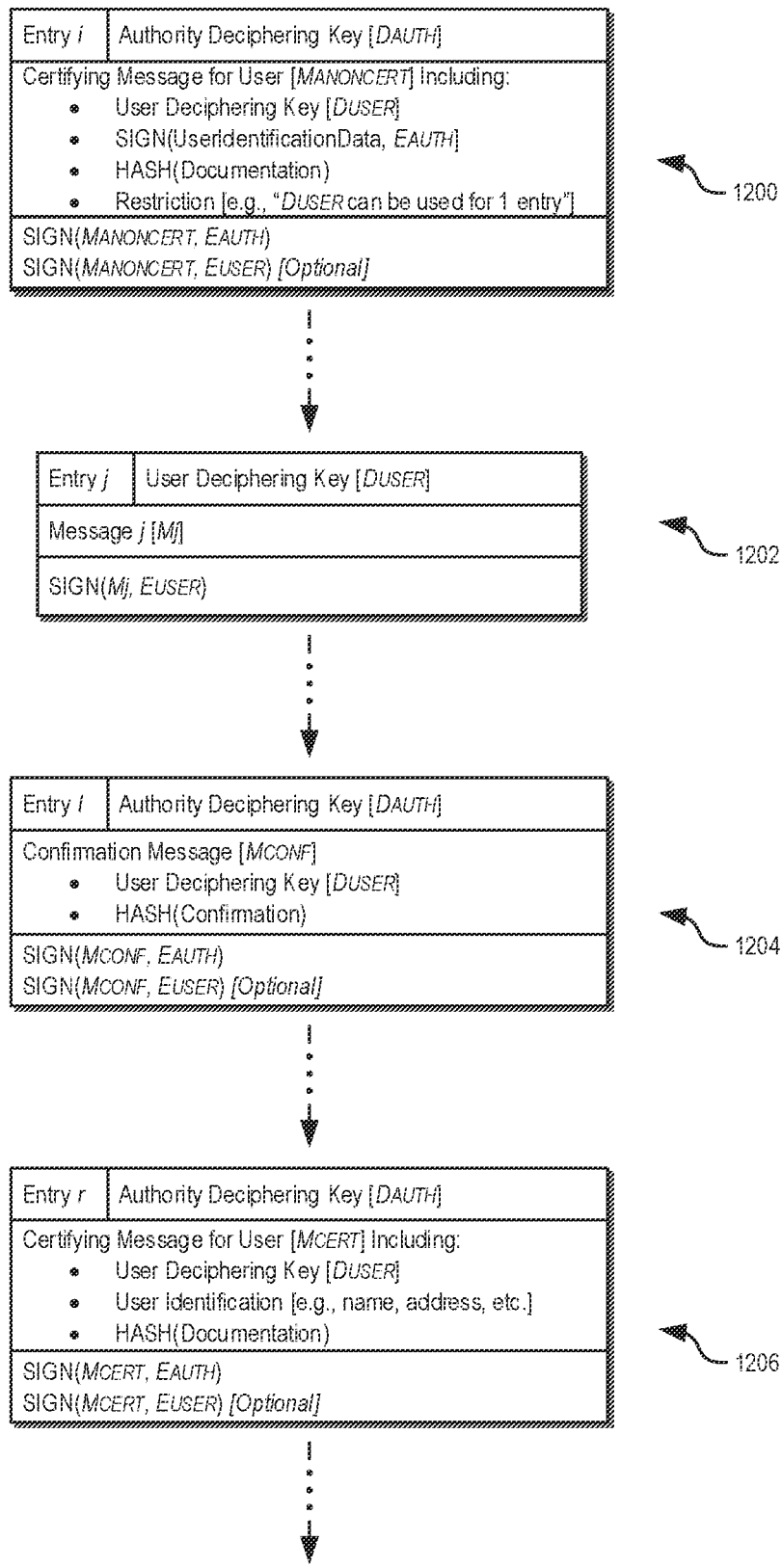
FIG. 12 illustrates an example of ledger entries where a user has requested that a name authority reveal a user's identity at a later time consistent with certain embodiments disclosed herein.
Figure 13:
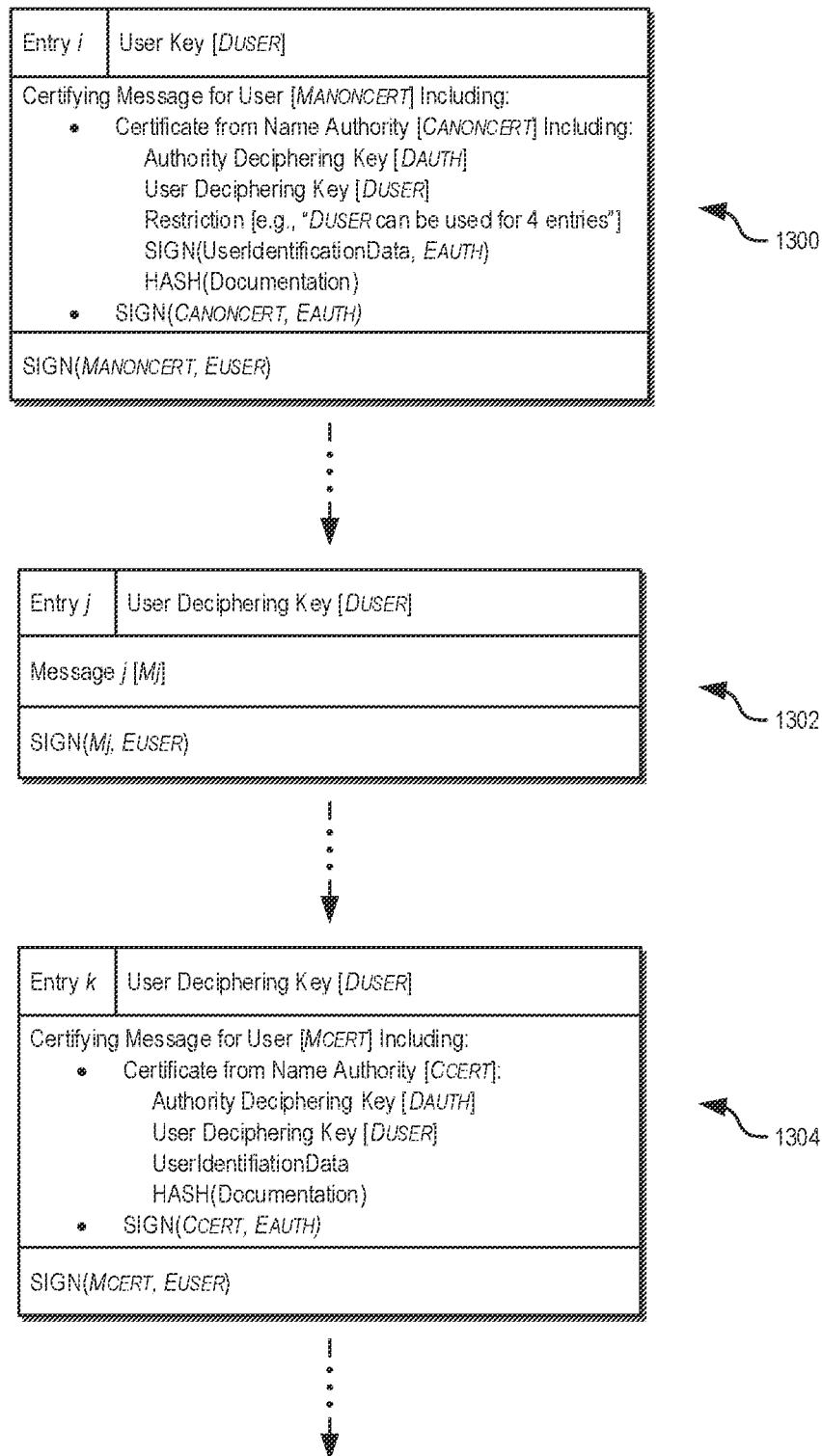
FIG. 13 illustrates an example of ledger entries where a user records an authority-signed certificate including a hash value of a user's identifying data and subsequently records a second authority-signed certificate including the user's unhashed identifying data consistent with certain embodiments disclosed herein.

Similarly, Entry 1 in FIG. 5, FIG. 6, FIG. 7, and FIG. 14, Entry k in FIG. 13, and Entry r in FIG. 12 may not necessarily be terminal within the ledger itself, but may instead be entries that conclude the particular user-authority interactions which enable a user to make the particular certified assertion $M_j$. It is noted that the transaction depicted in FIG. 14 may not necessarily begin with a certificate of the key owner's identity, but instead may begin with the committed message itself. In various described and illustrated embodiments, the ledger may contain many other transactions taking place during, before, and after the transactions schematically depicted in the figures.

In will be understood that the various strings of entries (e.g. i, j, k, l, and r) depicted in the figures may be "interleaved" with other such certifications in general, as well as potentially being interleaved with entries serving other (potentially arbitrary) purposes. Indeed, while various aspects of the example ledger entries shown in the figures may depict an isolated set of user-authority interactions for making an assertion $M_j$ for explanation and illustration purposes, the various disclosed embodiments are not so limited.

In various embodiments, a user may have multiple interactions with a given name authority, and the user may post new messages after their existing key is decertified by generating a new key and having it certified. Similarly, various embodiments may allow for the user to undergo certification of multiple keys and/or post assertions with multiple keys simultaneously.

Embodiments disclosed herein may be used in connection with ledgers that enable a variety of transactions, and the scope and/or purpose of entries interleaved within a ledger may be arbitrary and/or otherwise diverse. Such purposes may include, without limitation, entries which represent and/or initiate monetary transfers, transactions which may delegate authority, and/or administrative entries pertaining to a ledger. Hence, various embodiments of a disclosed ledger hosting such transactions may not be necessarily limited to those being used for making certified assertions. Various auxiliary data in the entries may be further used for a variety of other purposes.

Although various disclosed and/or illustrated embodiments may include entries relating to a transaction posted to a single ledger, it will be appreciated that different entries associated with a transaction may be posted in a plurality of ledgers and/or derivatives thereof. The manner in which a ledger, and/or multiple ledgers, are chosen for the posting of particular entries in a transaction may be implemented in a variety of ways, and any suitable mechanism, rules, and/or intelligence for determining which ledger to post a message may be used in connection with the disclosed embodiments.

In at least one example, entries could be posted to specific ledgers according to one or more designated procedures and/or conventions. For example, there may be a ledger A which may hold certificates of a user possessing a key, a ledger B where users may subsequently post assertions, and a ledger C where authorities may certify these assertions. The string representation of an entry can be used by the certifying entries to refer back to the assertions made in ledger B and A, and similarly for B referring to entries in A. For example, authorities may wish to include hashes of the assertions posted in ledger B (along with hashes of the cryptographic evidence used for proving that the assertions exist in ledger B) inside the confirmation entries posted in ledger C so as to provide assurance that the confirmation in ledger C was posted after the assertion in entry B. In some embodiments, these same security mechanisms can be applied, even without set rules for which ledger contains a given kind of entry.

In various embodiments, a hash function may take a string of arbitrary length (e.g., a number of characters) and may output a corresponding hash value based on the characters in the input string. The hash value is itself may be another string. Typically, hash values will be of the same length (e.g. 256 bits), although certain embodiments may use hash values of different lengths.

In some embodiments, a hash value may be relatively short in length, especially compared to long initial strings. In certain embodiments and instances herein, the notation HASH(String), where the "String" inside the parentheses is a name standing in for an arbitrary possible string, may refer to the hashed value of the "String."

In connection with the disclosed embodiments, HASH (String) may not reveal useful information about the contents of "String" itself. In addition, it may be difficult for any party to find two strings with the same hash value. In various embodiments, it may be assumed that every string has a unique hash value. The mechanism for computing the hash value of a string may be assumed to be public information; hence anyone with a given string can easily compute HASH (String). In some embodiments, the disclosed systems and methods may use hash functions in the SHA-2 family, including SHA-256 and SHA-512, although it will be appreciated that any hash function with some or all of the above-mentioned properties may be used in connection with the disclosed systems and methods.

In some embodiments, when using hash functions, a nonce or a small random string may be appended to the string intended for hashing (e.g., in cases where the hash value is intended for public distribution and the original string is meant to remain private). This may be the case for short and/or structured strings, such as identifying data. Such data can be relatively non-random, making it more susceptible to brute force attacks, where an attacker simply computes the hashes of large numbers of possible data strings and looks for a match between these hashes and the publicly distributed hash value. Adding a small number of random characters beforehand may make such an attack more difficult.

In some embodiments, a nonce may be unique to each string. When distributing the original string so that other parties can verify that the string's hash value matches that already given, the nonce may be included. Various aspects of the disclosed systems and methods can be applied both with or without augmenting strings intended for hashing with nonces. If nonces are used, in some embodiments, it may be assumed they are simply part of the original document, string, and/or file, and placed at a known location in that file.

Various aspects of the disclosed systems and methods may further use public key cryptographic methods. In some embodiments, a signature algorithm may be used that employs a public/private or enciphering/deciphering key pair. A key pair comprising an enciphering key E and deciphering key D (which may be both represented as strings) can be used to create a unique, publicly verifiable signature for a given string. Each enciphering key E may, in some embodiments, essentially define a hashing function unique to that key, whose hash values may be referred to as the signature of a string for the enciphering key E. The notation SIGN(M, E) may mean the signature of string M for enciphering key E. SIGN(M, E) may be computed with the value of both M and E. Given a string M, a signature SIGN(M, E), and the deciphering key D corresponding to E, it may be possible to verify whether or not the signature was produced by enciphering string M with enciphering key E.

The enciphering key may be designed to remain private to the user who creates it, hence enciphering keys are may be referred to in certain instances herein as private keys. The deciphering keys may be distributed freely, and may be referred to in certain instances herein as public keys. If the enciphering key is kept private to its owner/creator, then it may be reasonably used as a form of identity verification: the key's owner can post a public string (or document), the document signature, and the corresponding public key. Anyone can use the public key to verify that the document's signature was produced with the corresponding private key.

Consistent with various embodiments, public/private key pairs may be used to make a form of cryptographic assertion. The key owner may create a signature for their document and release it publicly. Because the properties of the enciphering function mimic those of hash functions, the key owner may find it difficult to produce another document with the same signature. At a later time, the key owner can reveal the document that they signed. Others can verify that the document's signature matches the previously committed signature and use the corresponding public key to verify that the key's owner produced the signature. Various aspects of the disclosed systems and methods may provide a mechanism to certify to others that the person making the assertion is who they claim to be, and to certify certain temporal information about when the assertion was made.

Distributed Immutable Message Ledgers

In various embodiments, the underlying implementation of a ledger can be structured in many different ways. It might be as simple as a linked list of consecutive entries. Entries could also be stored as rows in a database, and the database itself could be stored in a variety of suitable ways. For convenience and optimization purposes, the entries could be grouped together in blocks of varying sizes, where the blocks themselves contain integrity checks and indexing information. The blocks themselves may even be organized into more complicated arrangements, including but not limited to tree-like structures.

Figure 2:
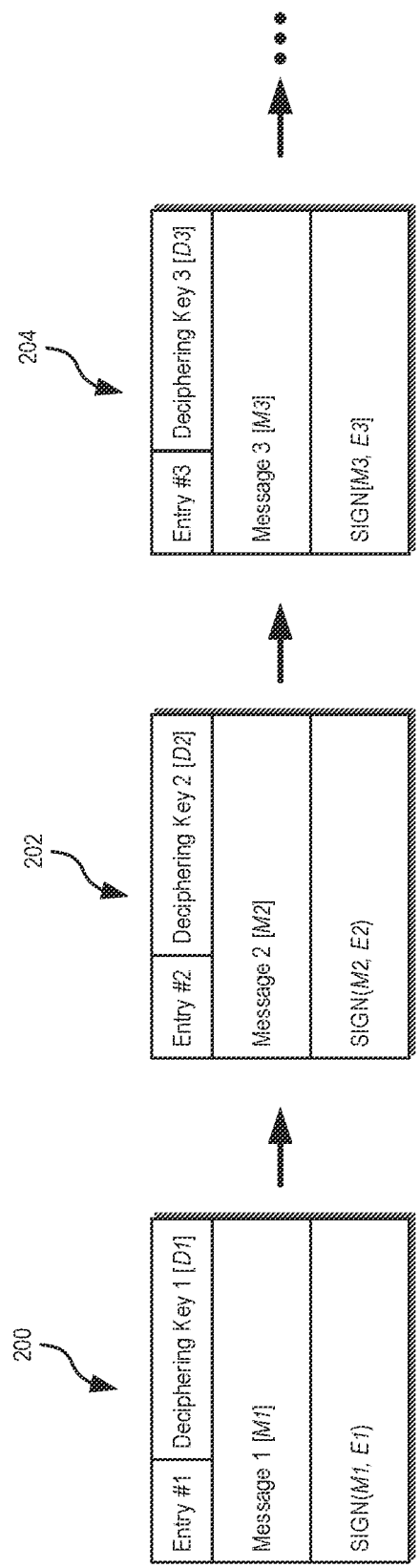
FIG. 2 illustrates an example of a message ledger consistent with certain embodiments disclosed herein.

FIG. 2 illustrates an example of a message ledger consistent with certain embodiments disclosed herein. A message ledger may comprise some and/or all of the information in the illustrated ledger consistent with embodiments disclosed herein (and may include additional entries not illustrated. Regardless of a ledger's specific implementation structure, in certain embodiments, the data contained inside a ledger can be functionally represented in a form similar to that depicted in FIG. 2. FIG. 2 may thus represent an example of a schematic of a functional representation of a ledger's data. When new entries are added to the ledger, their entry number may be greater than that of all other entries 200-204 in the ledger at the time of posting. In some embodiments, the actual location of an entry in files for storing the ledger data need not reflect its entry number, so long as the ledger can be presented to a user in a fashion similar to FIG. 2.

As illustrated and discussed above, each entry 200-204 in the message ledger may comprise an associated message, a signature of the message, and some associated deciphering key which others can use to verify that an entity with the deciphering key's associated enciphering key has signed the message. For example, as illustrated, entry 200 (i.e., "Entry 1") may include deciphering key 1 [$D_1$], message 1 [$M_1$], and a signature of message 1 made using the symmetrical enciphering key of deciphering key 1—$E_1$.

Figure 3A:
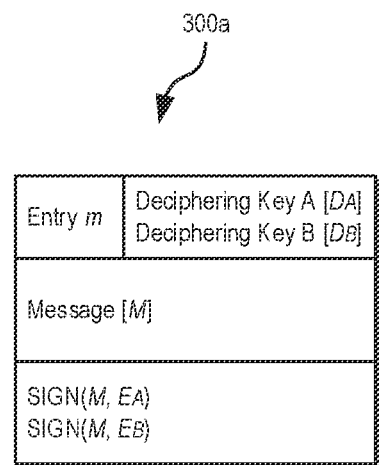
FIG. 3a illustrates an example of a ledger entry that includes deciphering key and signature fields that allow for multiple keys consistent with certain embodiments disclosed herein.
Figure 3B:
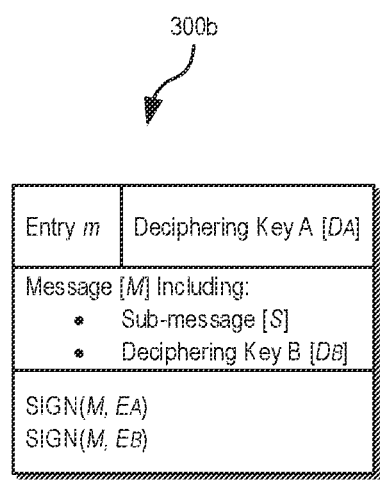
FIG. 3b illustrates an example of ledger entry that includes a deciphering key field, a message field with multiple parts, and a signature field where two enciphering keys are used to sign the message consistent with certain embodiments disclosed herein.

The layout and arrangement of a ledger itself can take many forms. For example, FIG. 3a illustrates an example of a ledger entry 300a that includes deciphering key and signature fields that allow for multiple keys consistent with certain embodiments disclosed herein. FIG. 3b illustrates an example of ledger entry 300b that includes a deciphering key field, a message field with multiple parts, and a signature field where two enciphering keys are used to sign the message consistent with certain embodiments disclosed herein.

Identity Verification of Assertion Submitters

Figure 4:
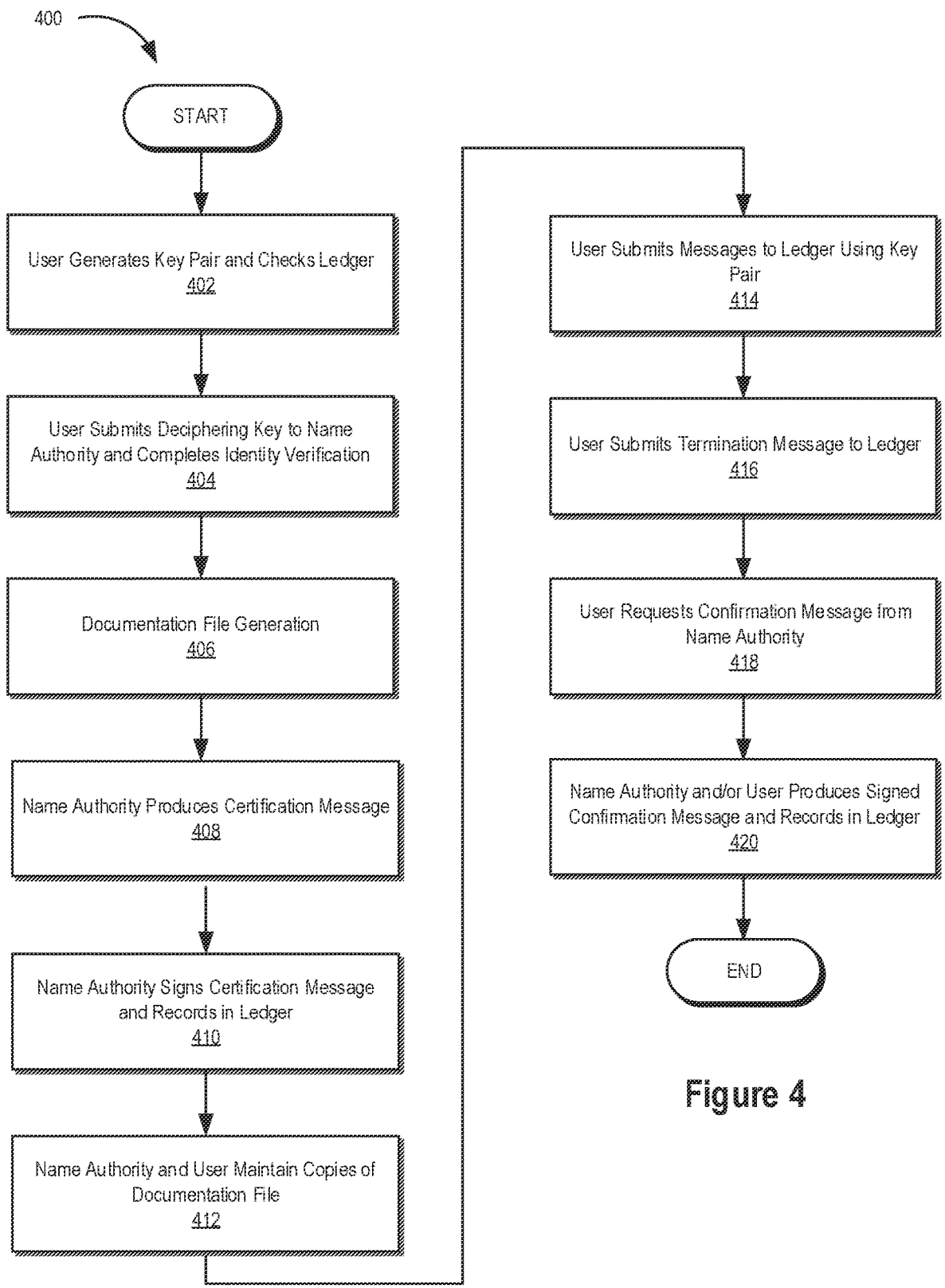
FIG. 4 illustrates a flow chart of an example of a method for recording and using assertions in ledger submissions consistent with certain embodiments disclosed herein.

FIG. 4 illustrates a flow chart of an example of a method 400 for recording and using assertions in ledger submissions consistent with certain embodiments disclosed herein. The illustrated method 400 may be implemented in a variety of ways, including using software, firmware, hardware, and/or any combination thereof. In certain embodiments, various aspects of the method 400 and/or its constituent steps may be performed by a user device, a name authority system (which may operate as assertion submitters), a node maintaining a trusted ledger, and/or any other suitable system and/or services or combination of systems and/or services.

Consistent with various aspects of the disclosed embodiments, a user may generate an enciphering/deciphering key pair ($E_{User}$ and $D_{User}$, respectively) at 402. The user may further check a trusted ledger to ensure that the corresponding deciphering key is not already present in recorded ledger entries.

At 404, the user may submit the deciphering key $D_{user}$ to a name authority and undergo an identity verification process similar to that experienced by those obtaining a digital certificate (e.g., an X.509 certificate). The name authority may, for example, require the user to call by phone, hold a video conference, submit scans of identifying documents (e.g., possibly on certified equipment), and/or perform related activities for identity verification.

Some and/or all of these activities may be used to create a documentation file at 406. This file may include recordings of video conferences and phone calls, documents (e.g., PDF documents) signed by a third party (e.g., using DocuSign and/or the like), and/or image scans. In particular, a documentation file may include some record of the user declaring that they are the owner of their enciphering key $E_{user}$. Such proof might include a video of the user reading out the characters of their public deciphering key and stating their ownership of the corresponding private key. The documentation file may also include a statement from the user requesting the authority to post a certificate to the ledger. These files may be combined together and hashed to produce the string HASH(Documentation).

The name authority may produce a certification message at 408. For example, referring to FIG. 5, the name authority may produce as part of a ledger entry 500 a certifying message $M_{Cert}$ which may comprise one or more constituent parts. The first part may be the user's public key. The certifying message may further include identification information. If the user is a person, then this information may include the person's name, contact information, address, and/or the like. If the key belongs to a business, the identifying information may include a company name, and possibly information such as corporate headquarters and contact information. The exact information included may vary from ledger to ledger, and even entry to entry, as long as ledger reading software can parse the information in context. The third piece of information in the certifying message may be the hash of the associated documentation file.

In further embodiments, the certifying message could include SIGN(Documentation, $E_{User}$) and SIGN(Documentation, $E_{Auth}$), to demonstrate that both the user and the authority have copies of the documentation and endorse them. For example, referring to FIG. 8, ledger entry 800 includes a certifying message that comprises SIGN(Documentation, $E_{User}$) and SIGN(Documentation, $E_{Auth}$).

Figure 6:
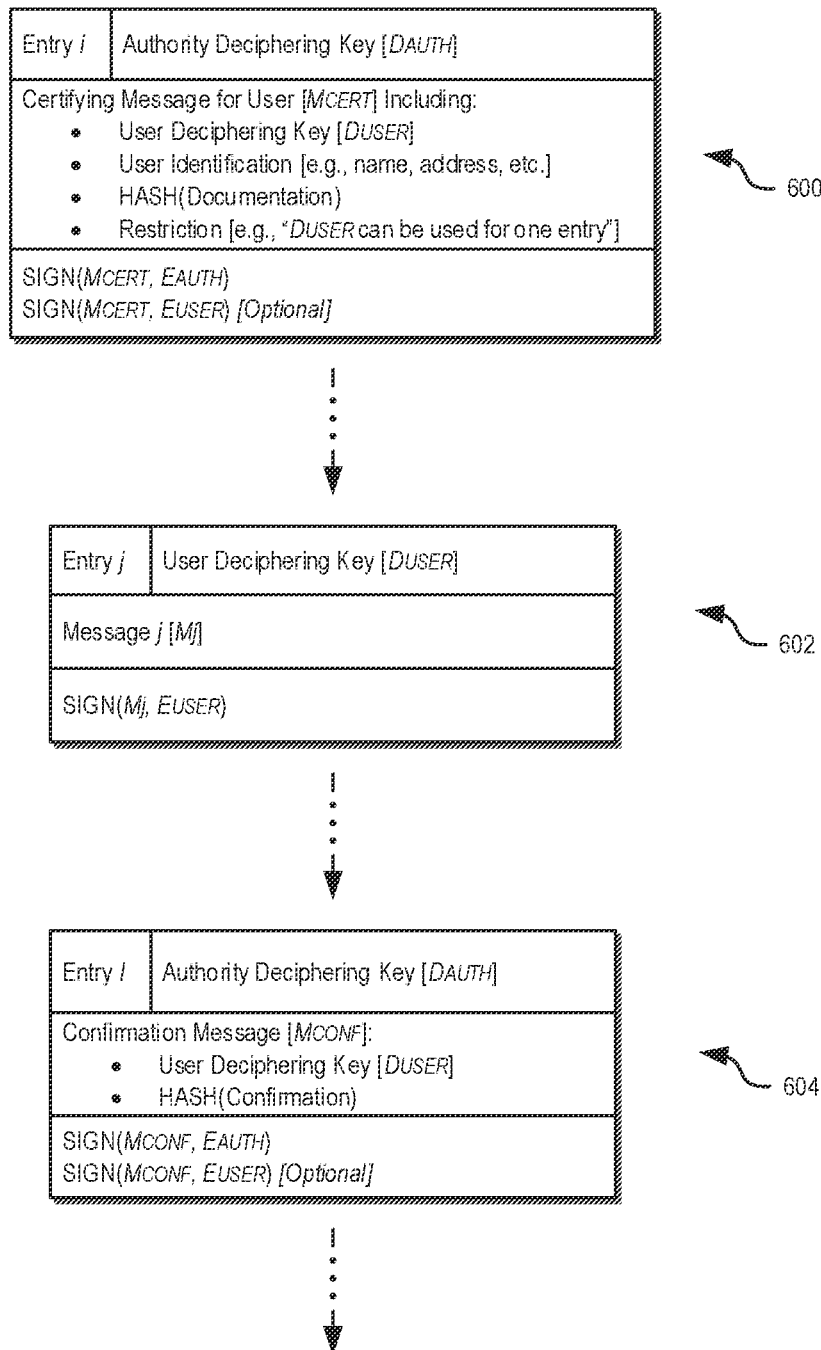
FIG. 6 illustrates an example of ledger entries that include timestamped assertions consistent with certain embodiments disclosed herein.

The certifying entries could potentially include various restrictions on a user's key usage. For example, a user may be restricted to post a fixed number of entries signed with their certified key. Referring to FIG. 6, ledger entry 600 may include a certification message that includes a restriction on a number of entries that may be signed with a particular deciphering key. Restrictions may be enforced manually by ledger node maintainers and/or or automatically enforced by ledger software. Other restrictions may include a fixed amount of time (e.g., one week) before the user's key pair may be considered outdated, after which time the user may need to submit a new key for certification by an appropriate authority.

Figure 5:
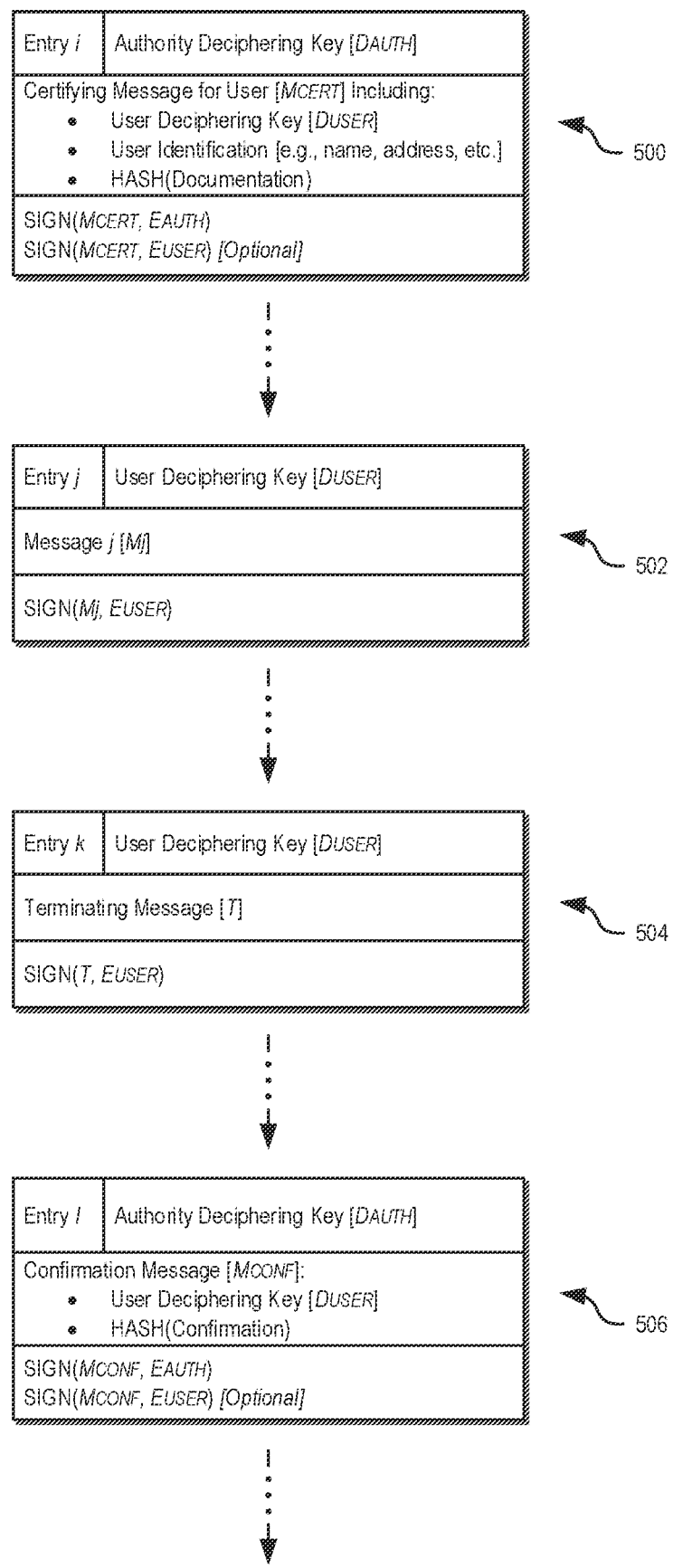
FIG. 5 illustrates an example of ledger entries that may be employed to allow a user to decertify a user cryptographic key consistent with certain embodiments disclosed herein.

As illustrated in FIG. 5, entries in a ledger may include an entry 500 that enables a name authority to certify a user identity (Entry i), an entry 502 representing a cryptographic assertion recorded to the ledger (Entry j), an entry 504 by the user decertifying their own key (Entry k) to prevent others from impersonating their identity, and an entry 506 posted by the authority (Entry l) confirming that messages posted with the user's key are legitimate consistent with various embodiments of the present disclosure. As used herein, the entry values i, j, k and l may represent "stand-in" names for integer values and may indicate the relative ordering of the entries listed: Entry i may precede Entry j, which may precede Entry k, which may precede Entry l. Ellipses illustrated in the various figures may imply that there may be intermediate entries on the ledger. The scheme may allow the user to add multiple entries to the ledger between entry i and k, but for simplicity, various examples herein may in some instances focus on a single message.

In further embodiments, a single ledger can feature multiple authorities signing for multiple users. Accordingly, the procedure schematically depicted in FIG. 5, illustrating a single transaction between one user and one authority is provided for illustration and explanation purposes, and should not be viewed as limiting.

Referring back to FIG. 4, at 410, the name authority may sign the certification message $M_{Cert}$ and add it as "Entry i" in the ledger. As an additional optional step designed to increase protections for the user, the ledger software can require that the certification message $M_{Cert}$ additionally be signed by the user's private key, giving the user a chance to verify the contact and key information included thereon. It will be understood that this protocol can take many different forms. For example, the user could post an additional entry between Entry i and Entry j which simply includes a signature of Entry i as a whole.

At 412, the name authority and/or the user may maintain copies of the documentation file for safekeeping. In certain embodiments, the documentation file may serve as a defense for both parties against accusations of malfeasance. For example, if the user accuses the authority of incompetence or wrongly tying someone else's key to their identity, the authority may be able to produce the original documentation file, which might include (for example) video evidence of the user declaring themselves to be the owner of the keys featured in the certificate. External parties to the dispute can compute the hash value for the documentation file. A match between the hash value and the ledger entry value may be strong assurance that the authority could only have produced Entry i if it was in possession of the documentation file at the time of the ledger entry, providing the authority with a degree of protection from liability.

Conversely, if the authority was in fact either incompetent and/or malicious, it may be unable to create a believable documentation file producing the correct hash result. In some embodiments, this protection may be predicated on the assumption that the documentation file contains a great enough quality and/or variety of proofs of endorsement from the user that it would be very difficult for the authority to forge such documents. If the authority simply loses the documentation file, this may be a sufficient indicator of the authority's incompetence to destroy trust in that ledger entry.

Similarly, in case the authority (maliciously and/or otherwise) claims that the user has misrepresented themselves, the user can present their copy of the documentation file as a defense, which may include statements from the name authority's representatives stating that they endorse the user's identity. If the user cannot produce this file, then entries in their name may become suspect.

Because existing entries in the ledger may not be altered and/or be readily altered, external parties can have confidence that the hash values listed in the entry were present at the time the entry was added. It follows that parties may be relatively confident that if a documentation file's hash value matches that in the entry, then the documentation file was used to produce the entry itself.

The materials used to produce the documentation file and/or a confirmation file, as described in more detail below, could vary from one authority to another, and from one entry and/or ledger to another. The materials used to produce documentation and/or confirmation files may thus vary from application-to-application to strike different balances between liability protection and convenience.

A user may submit messages for recordation to the ledger using the key pair which was certified by the name authority at 414. For example, referring to FIG. 5, a user may record a ledger entry 502 (Entry j) that includes a message—$M_j$—the user deciphering key, and a signature of the message using the user enciphering key. If the message includes a document hash, then the signature may constitute an assertion that the user possesses the associated document.

Referring back to FIG. 4, to mitigate the potential for attackers from impersonating a user through compromising a user's key, the user may submit a termination message for recordation to the ledger at 416. For example, referring to FIG. 5, a user may post a termination message entry 504 that includes a terminating message T and a signature of the terminating message using the user enciphering key. After recording the termination message entry 504, further entries submitted for addition to the ledger which are signed solely with $E_{User}$ may be automatically rejected by the ledger's maintainers, even if the entries are submitted by the user.

FIG. 6 illustrates an example of ledger entries 600-604 that include timestamped assertions consistent with certain embodiments disclosed herein. In some embodiments, a user's self-initiated preclusion of their key from further use via a termination message may be replaced by a restriction in an original certificate message included in a certifying message entry 600 that implements automatic key termination. For example, because the certificate in the certifying message entry 600 (Entry i) specifies that $E_{User}$ can be used to sign a single message, once the user has submitted message entry 602 (Entry j), the user need not take further action to disallow further use of their key.

In certain circumstances, it may be possible for an attacker to surreptitiously compromise a user's enciphering key after it is generated. An attacker can hold on to the compromised key (in some instances, without the user's knowledge) and wait until the name authority posts the certification of the key owner's identity on the ledger. The attacker can then impersonate the user by making assertions with $E_{User}$.

A confirmation entry, designated in various figures herein as Entry l and corresponding to entry 506 in FIG. 5 and entry 604 in FIG. 6, may be designed to mitigate against this kind of attack. Once further use of $D_{User}$ for posting ledger entries is disabled (e.g., either by posting a termination message, consuming the allotted number of entries specified by the key's certificate, a time expiry, and/or some other means), a user may have the opportunity to review all messages posted to the ledger with their key. The user can then determine if any messages have been posted in their name by an attacker. If no such messages are found, then the user can be sure that no false assertions can be made in their name in the future by using that key, since further use of the key is disallowed.

Various embodiments disclosed herein provide the user recourse in the case where the user does find forged messages in their name. The mechanism of recourse can take several forms based off of conventions determined by ledger maintainers. For example, the example ledger entries illustrated in connection with FIG. 5 and FIG. 6 may presume a ledger where entries that are made using keys that do not receive a confirmation message are assumed to be invalid. Referring back to FIG. 4, the user may perform a final step at 418 requesting a signed confirmation message from the name authority for their cryptographic assertions to be considered valid.

In connection with such a request, a user may prepare similar documentation to that used for obtaining a key's original certificate. These files may contain evidence that the user endorses entries made under $D_{User}$, and/or proofs of the user's identity. It may also include, for example, scans of documents containing the user's printed signature and/or a request for the name authority to post a confirmation message. Once the authority is satisfied that the user is who they claim to be, the user and/or authority may prepare a confirmation file similar to the documentation file found in Entry i and record the confirmation message in the ledger at 420. In some embodiments, HASH(Confirmation) may be included in the confirmation message.

Other conventions are possible. For example, the ledger's maintainers could presume that posted messages are legitimate unless explicitly revoked. In that case, the user may need not take action once further use of their key is disabled, except for when they find messages fraudulently posted in their name. In this situation, the user could send similar documentation to that required for building a confirmation message, except the request would be to "Revoke" all messages signed by $E_{User}$. In this case a revocation notice may be posted to the ledger.

A third convention is to allow the user to request a confirmation message from the authority if messages signed with $E_{User}$ are legitimate, and a revocation message if any entry using their key contains a message they did not intend to commit to. In this situation, ledger maintainers may rely on other parties using the ledger to determine how to interpret assertions made without either a follow-up confirmation or revocation.

When using the ledger entry convention illustrated in FIG. 5, other parties using the ledger may have very high confidence that assertions made by the user are valid, and that the user's stated identity is their real identity. In certain embodiments, the user and/or authority may maintain copies of the confirmation and/or revocation file for safe keeping, similar to their maintaining copies of the documentation file.

Figure 7:
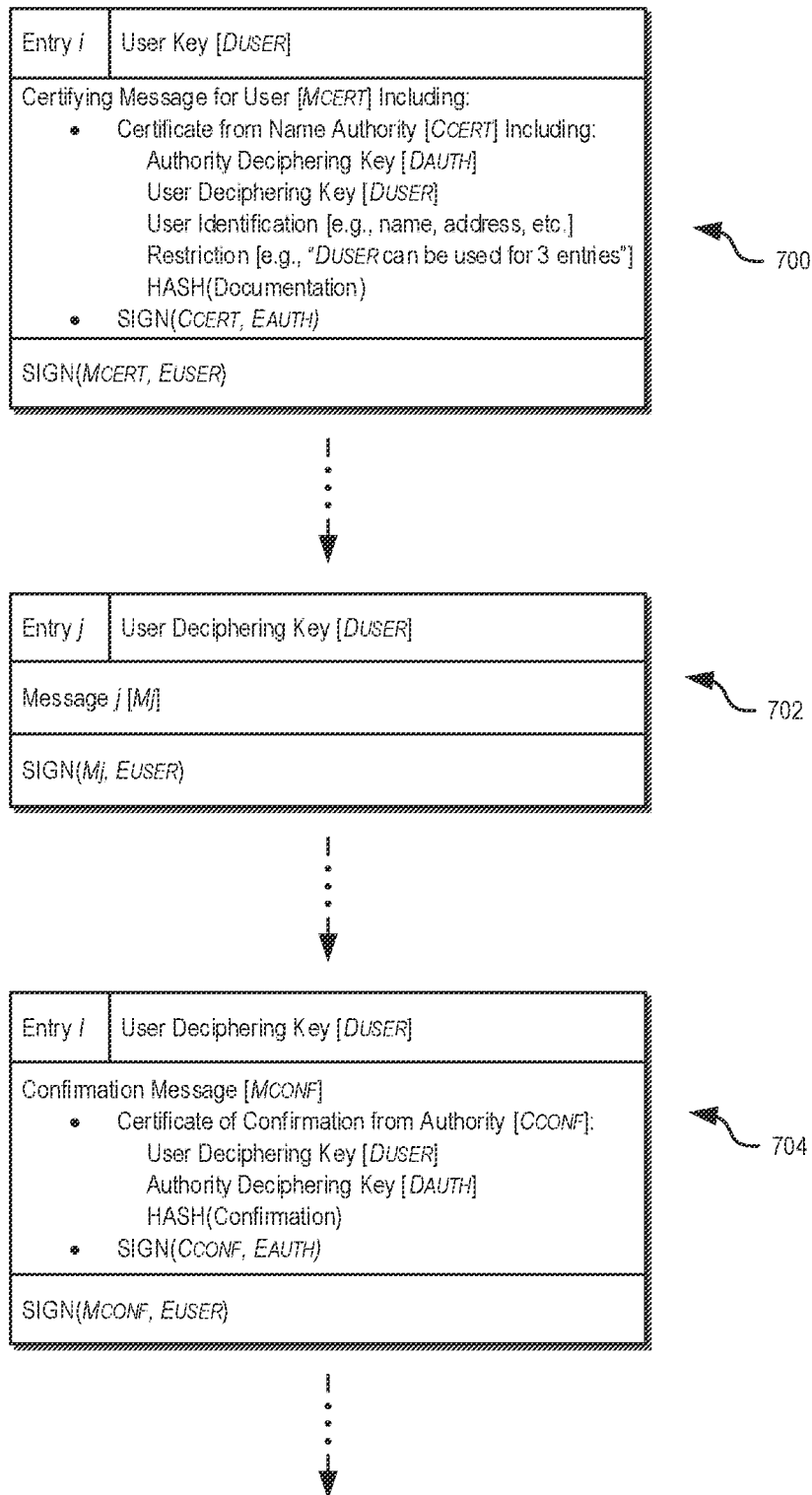
FIG. 7 illustrates an example of ledger entries that include various assertions consistent with certain embodiments disclosed herein.

In some embodiments, instead of and/or in addition to a name authority posting entries to the ledger, the authority could provide the user with a copy of the identity-key binding certificate, along with the signature of said certificate enciphered using the authority's private key. FIG. 7 illustrates an example of ledger entries 700-704 employing such a ledger entry scheme. Using the copy of the identity-key binding certificate, the user may post messages with the certificate themselves.

In the illustrated scheme, the name authority may provide a user with a signed certificate tying the user's key and identity together, and the user may post the certificate and its signature as a message on the ledger. For example, as illustrated, a certifying message entry 700 may be posted under a user's deciphering key that includes a certificate from a name authority including the authority deciphering key, the user deciphering key, user identification information, any applicable restrictions, and/or a hash of applicable documentation information. The message may further include a signature of the certificate using the authority enciphering key. The entry 700 may further include a signature of the certifying message made using the user enciphering key.

The user may record a ledger entry 702 (Entry j) that includes a message—$M_j$—and a signature of the message using the user enciphering key. The user may further post a confirmation message as an entry 704 under their deciphering key that includes a certificate of confirmation from the authority including the user deciphering key, the authority deciphering key, and/or a hash of applicable confirmation information. The confirmation message may further include a signature of the confirmation certificate using the authority enciphering key. The entry 704 may further include a signature of the confirmation message using the user enciphering key.

Figure 9:
FIG. 9 illustrates an example of a user-signed ledger entry containing certificates of identity from multiple trusted authorities consistent with certain embodiments disclosed herein.

FIG. 9 illustrates an example of a user-signed ledger entry 900 containing certificates of identity from multiple trusted authorities consistent with certain embodiments disclosed herein. Specifically, FIG. 9 illustrates an example of user-signed ledger entry 900 containing certificates of identity from two different trusted authorities, A and B, consistent with various embodiments of the present disclosure. In some embodiments, the trusted authorities may comprise independent name authorities.

As illustrated, entry 900 may be made under the user's deciphering key and may include a certifying message for the user that includes a certificate from a first name authority—Name Authority A—and a certificate from a second name authority—Name Authority B. The certifying message may further include a signature of the certificate from the first name authority using the enciphering key of the first name authority and a signature of the certificate from the second name authority using the enciphering key of the second name authority. The entry 900 may further include a signature of the certifying message using the enciphering key of the user.

In some embodiments, posting a certificate tying the user's key and identity together before posting any further messages signed with that user's private key may allays fears that an attacker can take credit for a user's assertions. Since the user may not sign assertions prior to their key's identity being verified, an attacker may not claim to another name authority to be the owner of the user's key. In further embodiments, this security assumption can be somewhat relaxed, as described herein.

Timestamping Assertions

Figure 10:
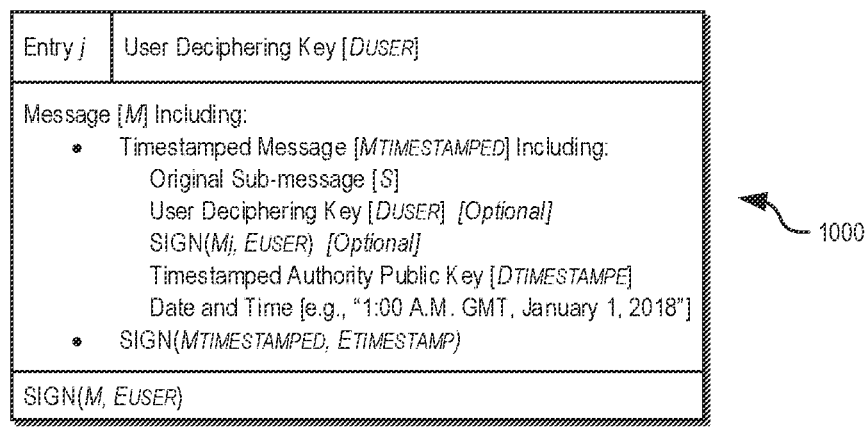
FIG. 10 illustrates an example of a user ledger entry augmented with timestamp information and signed by a trusted timestamping authority consistent with certain embodiments disclosed herein.

In some embodiments, messages posted to the ledger can be augmented with a timestamp, and ledger entries can feature a timestamping authority's signature of this augmented message. FIG. 10 illustrates an example of a user ledger entry 1000 augmented with timestamp information and signed by a trusted timestamping authority consistent with certain embodiments disclosed herein.

As illustrated in entry 1000, a user may record a message to the ledger under the user deciphering key that includes a timestamped message. The user may create the string S which they intend to commit to and may submit this string to a timestamping authority. The user may also include both $D_{User}$ and SIGN(S, $E_{User}$) in the submission. The timestamping authority may then append to string S a copy of its public key, $D_{Timestamp}$, along with the date and time at which the timestamping authority received string S from the user. The augmented message M may then be signed by both the user and the timestamp authority.

The timestamping authority may be an entity which, by definition, is trusted to both append the correct date and time at which it receives message S, and to guard its private key against relevant attackers. Once Entry j 1000 of FIG. 10 is posted on the ledger, other parties can be satisfied that the user must have possessed string S no later than the time listed in the message by the authority. If the message S is the hash value of a document possessed by the user, then Entry j 1000 in FIG. 10 may provide strong evidence that the user possessed that document no later than the date and time listed in the message. Furthermore, if S is the hash of a document, then the properties of hash functions may ensure that no other party viewing string S will be able to gather any information about the contents of the document from the string S itself. The user can thus publicly commit to possessing the document whose hash value is S at the time listed in Entry j 1000 without revealing sensitive information about the contents of that document by posting this assertion.

It will be appreciated that this method of timestamping entries on the ledger may be applied to any other suitable kind of ledger entry, such as those posted by name authorities both to bind keys to identities and to decommission their own keys. FIG. 10 shows illustrative examples of this method, and is not an exhaustive example of its applications or possible implementations.

It will be further appreciated that the role of a timestamp authority might be played by many parties. For example, it may be possible that a name authority could also offer this timestamping service, hence the timestamp authority and the name authority could be one in the same.

Decommissioning and Commissioning of Authority Keys

In some circumstances, name authorities' keys may, on occasion, be compromised. Such compromises could call the integrity of all entries in the ledger certified by the compromised authority into question. To mitigate this damage, name authorities may regular decommission their existing key(s) and certify new keys. Once an entry which decommissions an authority's existing key, $D_{Old}$, is posted to the ledger, then all future messages submitted under $D_{Old}$ may be automatically rejected by the ledger's maintainers. This may ensure that even if $E_{Old}$ is compromised after decommissioning, the integrity of user-key pairs certified with Dom prior to decommissioning remain ensured.

Figure 11:
FIG. 11 illustrates an example of a ledger entry in which a name authority retires one of its existing key pairs and activates a new pair of keys consistent with certain embodiments disclosed herein.

FIG. 11 illustrates an example of a ledger entry 1110 in which a name authority retires one of its existing key pairs and activates a new pair of keys consistent with certain embodiments disclosed herein. As illustrated, an entry 1100 that is used to decommission $D_{Old}$ can be used to "activate" a new public/private key pair for the same authority. The activation message can include restrictions on the use of $D_{New}$; for example, the authority may designate that it only wants entries signed with $E_{New}$ to be valid if they are posted inside of some limited time window (e.g., two weeks) after $D_{New}$'s activation. Alternatively, the authority can specify that $E_{New}$ should only be valid for certifying some fixed number (e.g., one hundred) key-user pairs. In either case, if keys commissioned by authorities have such restrictions, then a single key compromise may not necessarily call the integrity of more than a limited number of user-key pair certifications into question.

This scheme may additionally reduce an authority's liability if its keys are compromised, as most of the entries posted by that authority may have been signed using by then decertified private keys, hence the attacker who stole those keys may be unable to use them to forge new entries. Because the name authority's liability may be limited, the name authority may be able to recover its reputation more readily than if it had not implemented these policies, enabling it to leverage its existing expertise to strengthen security measures should their keys be compromised.

As noted above, FIG. 11 shows an example of an entry 1100 posted by a name authority to decommission its existing private key $E_{Old}$ and commission its new private key $E_{New}$. The exact layout of such a message may depend on conventions set by ledger users and maintainers, hence the entry of FIG. 11 is merely illustrative and should not be viewed as limiting. The entry may be posted under the authority's existing public key $D_{Old}$ and signed with $E_{Old}$ to demonstrate that it came from the authority.

In certain embodiments, the entry 1100 may be accompanied by a documentation file (which may be distributed externally from the ledger itself) where the authority declares in some official capacity that it is decommissioning its existing key and commissioning the new key pair $D_{New}$ and $E_{New}$. The entry's message may list the new public key value $D_{New}$. It may also feature a generic string G (whose contents may be determined by convention or policy of those maintaining and using the ledger) which signifies that the authority intends to decommission its existing key and activate the new one. The message G may be signed using $E_{New}$ to demonstrate that the authority indeed controls the new key pair. Finally, the documentation file's hash value may be included in the message. Users of the ledger can be reassured of the entry's integrity by first examining the documentation provided by the authority and verifying that this documentation's hash value matches the contents of the entry's message.

Certifying User Identities without Revealing Identifying Information

There may be occasions when a user wishes to make an assertion, but to not reveal their identity publicly until a later time. A variety of methods may be used to provide users with such functionality consistent with various aspects of the disclosed embodiments. In some embodiments, the choice of protocol may be affected by the user's relationship with available name authorities. In at least one method, the user may be presumed to have access to a name authority who they can trust with personal information and who they can trust not to reveal their identity.

An example of at least one possible implementation of this method is depicted in FIG. 12. FIG. 12 illustrates an example of ledger entries 1200-1206 where a user has requested that a name authority reveal the user's identity at a later time consistent with certain embodiments disclosed herein. In the illustrated procedure, an authority may make an assertion to the user's identity without revealing the identity directly, enabling observers to later verify that the identity subsequently revealed by the name authority matches the previous commitment.

The ledger entries 1200-1206 illustrated in FIG. 12 may be similar to certain entries detailed above, except that the message featured in entry 1200 (Entry i) may include the authority's signature of the identifying data instead of directly including this information (e.g., a signature of the user identification data using the authorities enciphering key). For example, as illustrated, entry 1200 may be recorded under the authority's deciphering key and may include a certifying message for an anonymous user that includes the user's deciphering key, a signature of the user's identifying data using the enciphering key of the authority, a hash of any associated documentation file, and/or any applicable restrictions. The entry 1200 may further include a signature of the certifying message for the anonymous user using the enciphering key of the authority and/or a signature of the certifying message for the anonymous user using the enciphering key of the user.

The user may record entries 1202 to the ledger under the user deciphering key. A confirmation message may be recorded to the ledger under the authority deciphering key as entry 1204 that may include fields and/or associated information similar to entry 506 in FIG. 5.

At a later time, when the user wishes for their identity to be known, they can request the authority to issue a certificate tying their key certified in entry 1200 (Entry i) to their true identity. Alternatively, the user's true identity could be posted automatically after a certain amount of time has passed.

The authority may record under its deciphering key a ledger entry 1206 that includes a certifying message for the user. The certifying message may include the user's deciphering key, the user's identification information, and/or a hash of associated documentation information. The entry 1206 may further include a signature of the certifying message for the user using the enciphering key of the authority and/or a signature of the certifying message for the user using the enciphering key of the user. Entry 1206 may be used to associate entries previously made in the ledger using the associated user deciphering key with a particular user's identity.

In the scheme illustrated in FIG. 12, the entry 1206 revealing the user's identity appears after the entry 1204 used to confirm the assertions made using that key are indeed the user's assertions. However, the confirmation and identity-revealing entries could be combined, or have their order reversed. The name authority may provide cryptographically verifiable proof that it has certified the user's identity. Once the user's identity is revealed, other parties can verify that the authority did indeed certify that identity.

The protocol outlined in FIG. 12 is similar in certain aspects to the implementation of FIG. 6. The authority-issued certificate's structure could also be in similar in certain aspects to that of entry 500 (Entry i) in FIG. 5, where there may be limited or no stipulated restrictions on the user's key usage, and instead the user initiates a self-revocation of their key.

FIG. 13 illustrates an example of ledger entries 1300-1304 where a user records an authority-signed certificate including a hash value of a user's identifying data and subsequently records a second authority-signed certificate including the user's un-hashed identifying data consistent with certain embodiments disclosed herein.

A name authority can issue the user two certificates. One certificate may feature a signature of the user's identifying information enciphered using $E_{Auth}$, and the second certificate may contain the un-hashed version of the user's identifying information. As illustrated, the user may record an entry 1300 in the ledger including a certifying message including a certificate from the authority that includes the authority deciphering key, the user deciphering key, applicable restrictions, a signature of the user's identification information using the enciphering key of the authority, and/or a hash of associated documentation. The certifying message may further include a signature of the certificate using the authority's enciphering key. The entry 1300 may further include a signature of the certifying message using the user's enciphering key.

The user may record an entry to the ledger 1302 to the ledger under the user deciphering key. If the user later wants their identity to be known, the user may record entry 1304 to the ledger. Entry 1304 may include including a certifying message including a certificate from the authority that includes the authority deciphering key, the user deciphering key, the user's identification information, and/or a hash of associated documentation message. The certifying message may further include a signature of the certificate using the authority's enciphering key. The entry 1304 may further include a signature of the certifying message using the user's enciphering key. Entry 1304 may be used to associate entries previously made anonymously in the ledger using the associated user deciphering key with a particular user's identity.

Retroactively Certifying a User's Identity

There may be situations in which a user does not have access to a trustworthy name authority at the time they wish to post assertions to the ledger, yet where the user wishes to make assertions that they will later tie to their identity.

Figure 14:
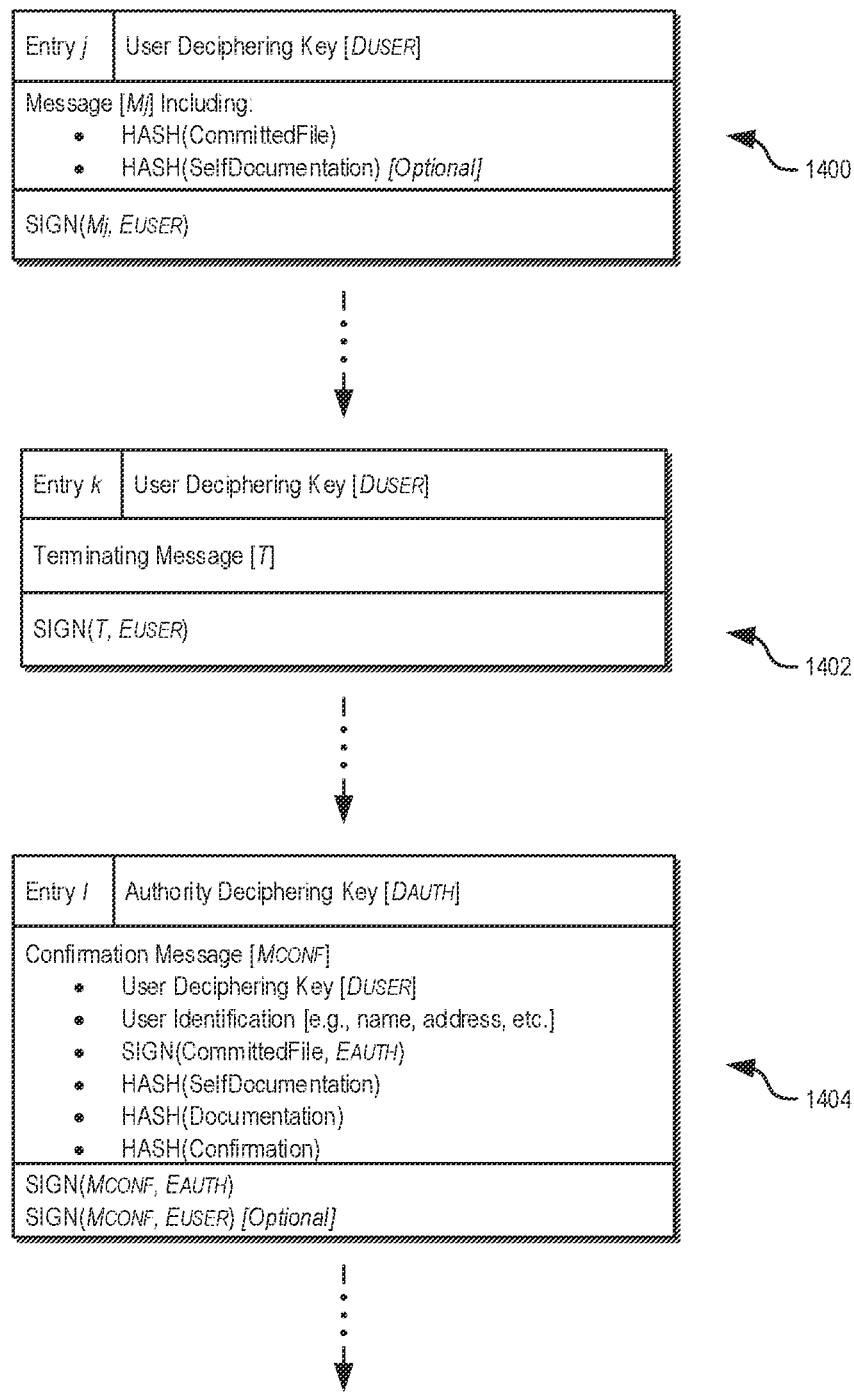
FIG. 14 illustrates an example of ledger entries where a user anonymously records assertions to the ledger and later requests that a name authority tie their identity to the assertions consistent with certain embodiments disclosed herein.

FIG. 14 illustrates an example of ledger entries 1400-1404 where a user anonymously records assertions to the ledger and later requests that a name authority tie their identity to the assertions consistent with certain embodiments disclosed herein. Specifically, in the entries 1400-1404, a user may first anonymously post assertions to the ledger and may later request that a name authority associate their identity to assertions previously enciphered with the users enciphering key $E_{User}$.

For example, a user may record an entry 1400 to a ledger under a user deciphering key that includes a message including a hash of a committed file and/or document and/or a hash of self-documentation associated with the user's identity. This self-documentation may help to allay a name authority's concerns that the user in question is attempting to claim some other person's entries as their own.

The user may post an entry 1402 under their user deciphering key that includes a terminating message. After posting the terminating message entry 1402, an entry 1404 may be posted under an authority deciphering key that includes a confirmation message including an user deciphering key, user identification information, a signature of the committed file and/or document using the enciphering key of the authority, and hashes of the self-documentation, any further documentation, and/or a confirmation message. The entry 1404 may further include a signature of the confirmation message using the enciphering key of the authority and/or a signature of the confirmation message using the enciphering key of the user.

In certain embodiments, the authority may desire copies of the committed documents and make a judgement on whether it is likely that the user actually produced them. This may be to compensate against the mentioned "credit stealing" attack.

It will be appreciated that a number of variations can be made to the architecture, relationships, and examples presented in connection with the figures within the scope of the inventive body of work. For example, in some embodiments, confirmation certificates featured in confirmation entries (e.g., Entry/in various figures) could include a hash of a string formed by concatenating the string representation of all entries featuring a user's cryptographic assertions. Thus, it will be appreciated that the architecture, relationships, and examples presented in connection with the figures are provided for purposes of illustration and explanation, and not limitation.

Examples of Consumers of Services

A variety of users may use various aspects of the disclosed systems and methods, including, without limitation, one or more of:

A person wishing to create strong cryptographic evidence that they endorse a legal statement or document in some capacity, without publicly revealing the contents of that document until a later time. For example, a person may wish to certify their authorship of their own legal will without revealing the contents of their will to their family until said will goes into effect. The hash value of said will could be posted to an immutable ledger (specifically as the message in Entry j of FIG. 5). When a copy of the will is revealed to the relevant parties, then its hash value can be computed and verified to correspond with the writer's posted ledger entry. Even if the keys used for posting said entry have been long compromised and/or lost, the family can be sure that entry's contents are genuine. The family could also be sure that there will be no other entries posted under the same key (i.e., that no other family member has impersonated the writer of the will).

Those interested in a "quick" way of establishing priority of ownership, especially for creating copyrightable and/or patentable content. For example, a photographer may wish to establish proof of possessing (and presumably, having created) some photographs prior to posting them online. The photographer could include hashes of collections of photos in a ledger entry, with the photographer's identity certified and ledger entries confirmed in a manner similar to that described in connection with FIG. 5.

A pair of companies wishing to post non-revocable proofs of agreeing to a certain contract, wherein certain information in the contract is bound by non-disclosure agreements. Both companies could post the hashed value of a digital copy of said contract to ledger entries tied to aliases for their identities. As the companies may wish to remain anonymous to the general public until a later date (e.g. they want to keep certain supply dealership agreements confidential), they may use aspects of the protocol described in connection FIG. 12.

An investigative journalist in an unfriendly country or area wishing to document their findings in a way that is tied to their identity, but where said journalist may not wish for their identity to be publicly revealed until after exiting leaving said hostile environment (possibly as a matter of their personal safety). Such a journalist may wish to use the procedure illustrated in FIG. 12 and/or FIG. 13 to upload proof of possessing certain documentation at a later time. If the mission is extremely dangerous, the journalist may wish to have their identity automatically revealed after a certain period of time, on the presumption they will not be able to make it safety.

The procedure depicted in FIG. 14 may be of use to those wishing to document their identities and possession of certain documents, but who are in locations whose internet access is monitored or censored, and hence may not have access to reputable name authorities until a later date.

Examples of Providers of Services

A variety of providers may provide various aspects of the services associated with disclosed systems and methods, including, without limitation, one or more of:

Certificate authorities and name authorities providing identity verification services. Such authorities could charge users for certifying documentation, charge users for posting and signing ledger entries with their certifying keys.

Cryptocurrency and blockchain technology providers who may offer this as an additional new service, possibly as a distinct kind of transaction on existing blockchains.

Software for managing and generating secure random public/private key pairs, which may be used by consumers of the services outlined above.

Figure 15:
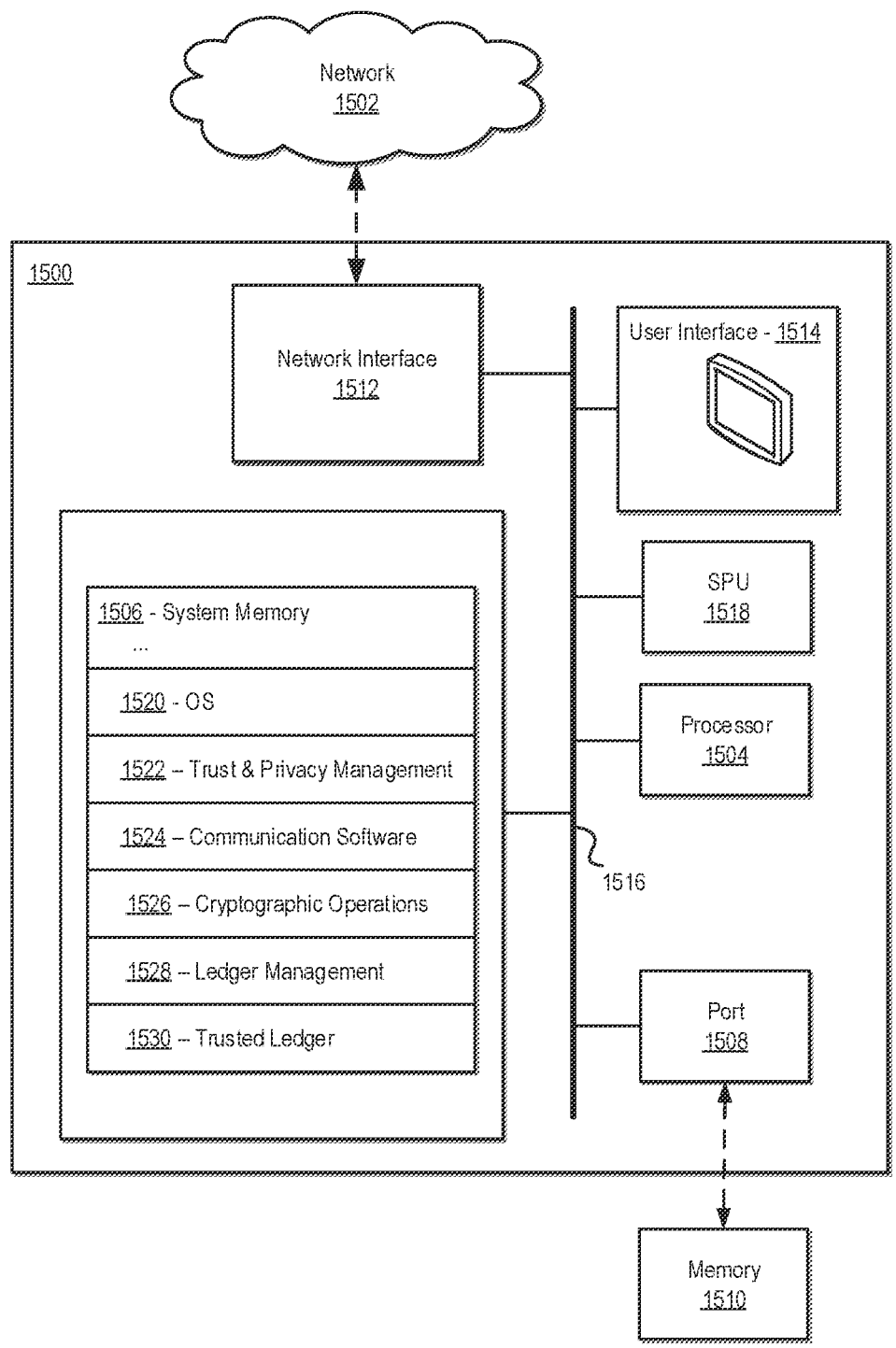
FIG. 15 illustrates an example of a system that may be used to implement certain embodiments of the systems and methods disclosed herein.

FIG. 15 illustrates an example of a system 1500 that may be used to implement certain embodiments of the systems and methods of the present disclosure. The exemplary system 1500 of FIG. 15 may comprise a system and/or device associated with a user and/or client system, an assertion submitter, a witness, trusted ledger node operator and/or trusted ledger management system, a name and/or other trusted authority, a querying system, and/or any other service, system, device, entity, node, application and/or component configured to implement aspects of the embodiments of the disclosed systems and methods The various systems and/or devices used in connection with aspects of the disclosed embodiments may be communicatively coupled using a variety of networks and/or network connections (e.g., network 1502). In certain embodiments, the network 1502 may comprise a variety of network communication devices and/or channels and may utilize any suitable communications protocols and/or standards facilitating communication between the systems and/or devices. The network 1502 may comprise the Internet, a local area network, a virtual private network, and/or any other communication network utilizing one or more electronic communication technologies and/or standards (e.g., Ethernet or the like). In some embodiments, the network 1502 may comprise a wireless carrier system such as a personal communications system ("PCS"), and/or any other suitable communication system incorporating any suitable communication standards and/or protocols. In further embodiments, the network 1502 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 1502 may incorporate one or more satellite communication links. In yet further embodiments, the network 1502 may utilize IEEE's 802.11 standards, Bluetooth®, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 15, the example system 1500 may comprise: a processing unit 1504; system memory 1506, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 1504; a port 1508 for interfacing with removable memory 1510 that may include one or more diskettes, optical storage mediums (e.g., flash memory, thumb drives, USB dongles, compact discs, DVDs, etc.)

and/or other non-transitory computer-readable storage mediums; a network interface 1512 for communicating with other systems via one or more network connections and/or networks 1502 using one or more communication technologies; a user interface 1514 that may include a display and/or one or more input/output devices such as, for example, a touchscreen, a keyboard, a mouse, a track pad, and the like; and one or more busses 1516 for communicatively coupling the elements of the system.

In some embodiments, the system 1500 may, alternatively or in addition, include an SPU 1518 that is protected from tampering by a user of the system or other entities by utilizing secure physical and/or virtual security techniques. An SPU 1518 can help enhance the security of sensitive operations such as personal information management, trusted credential and/or key management, privacy and policy management, and other aspects of the systems and methods disclosed herein. In certain embodiments, the SPU 1518 may operate in a logically secure processing domain and be configured to protect and operate on secret information, as described herein. In some embodiments, the SPU 1518 may include internal memory storing executable instructions or programs configured to enable the SPU 1518 to perform secure operations, as described herein.

The operation of the system 1500 may be generally controlled by the processing unit 1504 and/or an SPU 1518 operating by executing software instructions and programs stored in the system memory 1506 (and/or other computer-readable media, such as removable memory 1510). The system memory 1506 may store a variety of executable programs or modules for controlling the operation of the system. For example, the system memory may include an operating system ("OS") 1520 that may manage and coordinate, at least in part, system hardware resources and provide for common services for execution of various applications and a trust and privacy management system 1522 for implementing trust and privacy management functionality including protection and/or management of personal data through management and/or enforcement of associated policies. The system memory 1510 may further include, without limitation, communication software 1524 configured to enable in part communication with and by the system, one or more applications, a cryptographic operation module 1526 configured to perform various aspects of the disclosed embodiments (e.g., message generation, cryptographic key and hashing operations, etc.), a ledger management module 1528 configured to perform various ledger management operations consistent with the disclosed embodiments, one or more distributed ledgers and/or ledger derivatives 1530, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified with the scope and equivalents of the appended claims.

What is claimed is:

1. A method for managing a trusted ledger performed by a trusted ledger management system, the trusted ledger management system comprising a processor and a non-transitory computer-readable storage medium storing instructions that, when executed by the processor, cause the trusted ledger management system to perform the method, the method comprising:

receiving a first request to record a first entry in the trusted ledger maintained by the trusted ledger management system, the first entry associating a user deciphering key with an identity associated with a user system, the first entry being further associated with a deciphering key of a trusted authority and comprising a certification message and a signature of the certification message generated using an enciphering key of the trusted authority, the certification message comprising the user deciphering key and user identification information associated with the identity associated with the user system;

recording the first entry in the trusted ledger;

receiving a second request from the user system to record a second entry in the trusted ledger, the second entry being associated with the user deciphering key and comprising a first message;

recording, based at least in part on the first entry, the second entry to the trusted ledger in a first location after the first entry;

receiving a third request to record a third entry in the trusted ledger, the third entry being associated with the user deciphering key and comprising a termination message;

recording the third entry to the trusted ledger in a second location after the first location of the second entry;

receiving a fourth request from the user system to record a fourth entry in the trusted ledger, the fourth entry being associated with the user deciphering key and comprising a second message;

determining, based at least in part on the termination message of the third entry, that entries associated with the user deciphering key are not permitted to be recorded in the trusted ledger in a third location after the second location of the third entry; and denying the fourth request from the user system to record the fourth entry based on the determination that entries associated with the user deciphering key are not permitted to be recorded in the trusted ledger in the third location after the second location.

2. The method of claim 1, wherein the first request to record the first entry in the trusted ledger is received from the trusted authority.

3. The method of claim 1, wherein the first request to record the first entry in the trusted ledger is received from the user system.

4. The method of claim 1, wherein the third request to record the third entry in the trusted ledger is received from the trusted authority.

5. The method of claim 1, wherein the third request to record the third entry in the trusted ledger is received from the user system.

6. The method of claim 1, wherein the certification message of the first entry further comprises at least one restriction.

7. The method of claim 6, wherein the at least one restriction comprises at least one of a number of times the user deciphering key is authorized for use to record entries in the trusted ledger and a length of time the user deciphering key is authorized for use to record entries in the trusted ledger.

8. The method of claim 7, wherein the recording the second entry to the trusted ledger in the first location after the first entry is performed in accordance with the at least one restriction included in the certification message.

9. The method of claim 1, wherein the third entry further comprises a signature of the termination message generated using the user enciphering key.

10. The method of claim 1, wherein the first entry is generated by the trusted authority.

11. The method of claim 1, wherein the certification message comprises a hash of documentation information attesting to the identity associated with the user system.

12. The method of claim 1, wherein the certification message comprises a certificate from the trusted authority and a signature of the certificate generated using an enciphering key of the trusted authority.

13. The method of claim 12, wherein the certificate comprises the deciphering key of the trusted authority.

14. The method of claim 1, wherein the method further comprises:
receiving a fifth request to record a fifth entry in the trusted ledger in a fourth location after the first entry, the fifth entry being associated with a deciphering key of the trusted authority, the fifth entry comprising a confirmation message and a signature of the confirmation message generated using the enciphering key of the trusted authority.

15. The method of claim 14, wherein the confirmation message comprises the user deciphering key.

16. The method of claim 15, wherein the confirmation message comprises a confirmation certificate generated by the trusted authority comprising the user deciphering key and the deciphering key of the trusted authority.

17. The method of claim 14, wherein the fifth request to record the fifth entry in the trusted ledger is received from the trusted authority.

18. The method of claim 14, wherein the fifth request to record the fifth entry in the trusted ledger is received from the user system.

19. The method of claim 14, wherein the fifth entry is generated by the trusted authority.

20. The method of claim 1, wherein recording the first entry in the trusted ledger is performed in response to a determination that the trusted ledger does not include an entry associated with the user deciphering key.

* * * * *